United States Patent
Bouchier et al.

(10) Patent No.: US 10,852,541 B2
(45) Date of Patent: Dec. 1, 2020

(54) METHODS AND SYSTEMS FOR AUGMENTED REALITY

(71) Applicant: Essilor International, Charenton le Pont (FR)

(72) Inventors: Aude Bouchier, Charenton le Pont (FR); Jean-Paul Cano, Charenton-le-Pont (FR); Samuel Archambeau, Charenton-le-Pont (FR)

(73) Assignee: Essilor International, Charenton le Pont (FR)

( * ) Notice: Subject to any disclaimer, the term of this patent is extended or adjusted under 35 U.S.C. 154(b) by 0 days.

(21) Appl. No.: 15/741,327

(22) PCT Filed: Jun. 30, 2016

(86) PCT No.: PCT/EP2016/065361
§ 371 (c)(1),
(2) Date: Jan. 2, 2018

(87) PCT Pub. No.: WO2017/005608
PCT Pub. Date: Jan. 12, 2017

(65) Prior Publication Data
US 2018/0203232 A1   Jul. 19, 2018

(30) Foreign Application Priority Data
Jul. 3, 2015   (EP) .................... 15306097

(51) Int. Cl.
*G02B 27/01*  (2006.01)
*G02F 1/1334*  (2006.01)
(Continued)

(52) U.S. Cl.
CPC ....... *G02B 27/0172* (2013.01); *G02B 5/1828* (2013.01); *G02C 7/02* (2013.01);
(Continued)

(58) Field of Classification Search
CPC .............. G02B 27/0172; G02B 27/017; G02B 2027/0178; G02B 2027/014;
(Continued)

(56) References Cited

U.S. PATENT DOCUMENTS 5,548,301 A     8/1996  Kornher et al.
6,469,683 B1   10/2002  Suyama et al.
(Continued)

FOREIGN PATENT DOCUMENTS

EP   0 377 182 A2   7/1990
EP   0 785 457 A2   7/1997
(Continued)

OTHER PUBLICATIONS

Koulieris, George Alex, et al. "Near-Eye Display and Tracking Technologies for Virtual and Augmented Reality." Computer Graphics Forum. vol. 38. No. 2. 2019. (Year: 2019).*
(Continued)

*Primary Examiner* — Xiao M Wu
*Assistant Examiner* — Scott E Sonners
(74) *Attorney, Agent, or Firm* — Oblon, McClelland, Maier & Neustadt, L.L.P.

(57) ABSTRACT

A method and system for image display with a head-mounted device, which use a see-through tunable diffractive mirror, such as a see-through tunable holographic mirror or see-through tunable LCD array mirror, which mirror is useful in providing augmented reality.

19 Claims, 11 Drawing Sheets

(51) Int. Cl.
*G02C 7/08* (2006.01)
*G02B 5/18* (2006.01)
*G02C 7/02* (2006.01)
*G06T 19/00* (2011.01)

(52) U.S. Cl.
CPC ............. *G02C 7/083* (2013.01); *G02C 7/086* (2013.01); *G02F 1/1334* (2013.01); *G02F 1/13342* (2013.01); *G06T 19/006* (2013.01); *G02B 27/0179* (2013.01); *G02B 2027/011* (2013.01); *G02B 2027/0123* (2013.01); *G02B 2027/0138* (2013.01); *G02B 2027/0174* (2013.01); *G02B 2027/0178* (2013.01); *G02B 2027/0187* (2013.01); *G02F 2203/50* (2013.01)

(58) Field of Classification Search
CPC ................ G02B 27/0101; G02B 27/01; G02B 2027/0174; G02B 2027/0187; G02B 27/0179; G02B 2027/0125; G02B 27/0093; G02B 27/0081; G06T 19/006; H04N 13/332; G06K 9/00671; G09G 3/346

See application file for complete search history.

(56) References Cited

U.S. PATENT DOCUMENTS

| | | | |
|---|---|---|---|
| 7,154,654 B2 | 12/2006 | Kimura | |
| 7,742,215 B2 | 6/2010 | Hagood, IV | |
| 2002/0047837 A1 | 4/2002 | Suyama et al. | |
| 2004/0160389 A1 | 8/2004 | Suyama et al. | |
| 2004/0164927 A1 | 8/2004 | Suyama et al. | |
| 2010/0149073 A1* | 6/2010 | Chaum | G02B 27/0093 345/8 |
| 2012/0306940 A1* | 12/2012 | Machida | G02B 6/005 345/690 |
| 2013/0314793 A1 | 11/2013 | Robbins et al. | |
| 2014/0146394 A1* | 5/2014 | Tout | G09B 9/307 359/630 |
| 2014/0232651 A1 | 8/2014 | Kress et al. | |
| 2015/0316768 A1 | 11/2015 | Simmonds | |
| 2016/0018658 A1 | 1/2016 | Machida et al. | |
| 2016/0260258 A1* | 9/2016 | Lo | H04N 13/383 |
| 2017/0299869 A1* | 10/2017 | Urey | A61B 3/032 |
| 2017/0343809 A1* | 11/2017 | Benesh | G09G 5/00 |
| 2018/0176483 A1* | 6/2018 | Knorr | G06T 19/006 |

FOREIGN PATENT DOCUMENTS

| | | |
|---|---|---|
| EP | 2 530 510 A2 | 12/2012 |
| EP | 15305504.1 | 4/2015 |
| JP | 2010-26273 A | 2/2010 |
| WO | 00/28369 A2 | 5/2000 |
| WO | 01/09685 A1 | 2/2001 |
| WO | 2007/144308 A1 | 12/2007 |
| WO | 2010/010275 A2 | 1/2010 |
| WO | 2010/125337 A2 | 11/2010 |
| WO | 2014/091201 A1 | 6/2014 |
| WO | 2014/126692 A1 | 8/2014 |
| WO | 2015/032824 A1 | 3/2015 |
| WO | 2015/032828 A1 | 3/2015 |
| WO | 2016/156614 A1 | 10/2016 |

OTHER PUBLICATIONS

International Search Report dated Nov. 17, 2016 in PCT/EP2016/065361 filed Jun. 30, 2016.
Extended European Search Report dated Dec. 3, 2015 in European Application 15306097.5 filed Jul. 3, 2015.

* cited by examiner

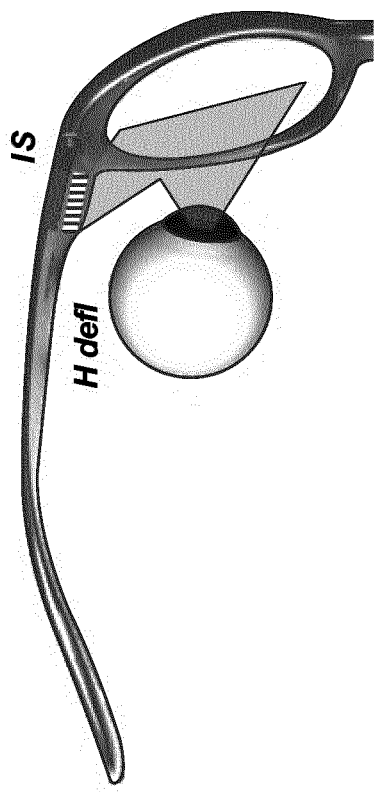
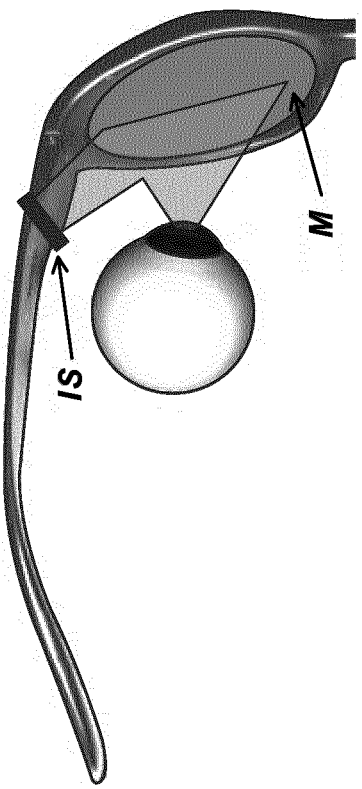
FIG. 1

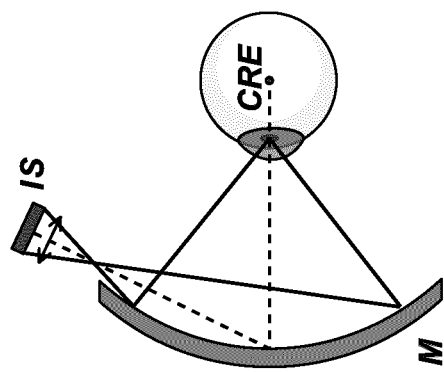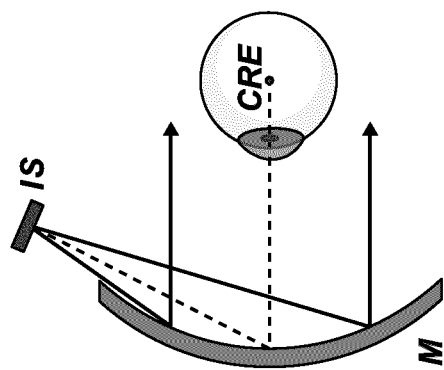
FIG. 4

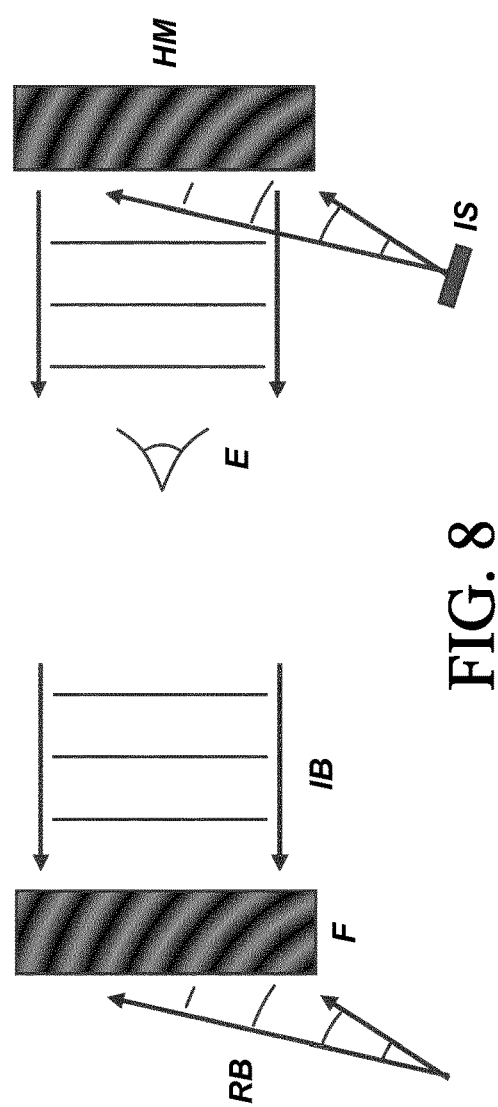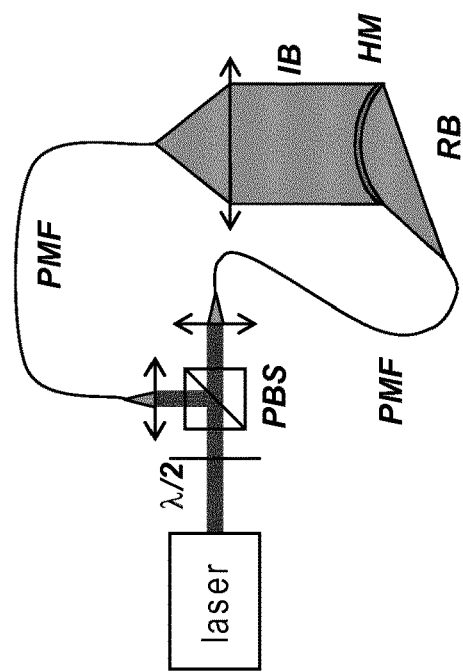
FIG. 8
FIG. 9

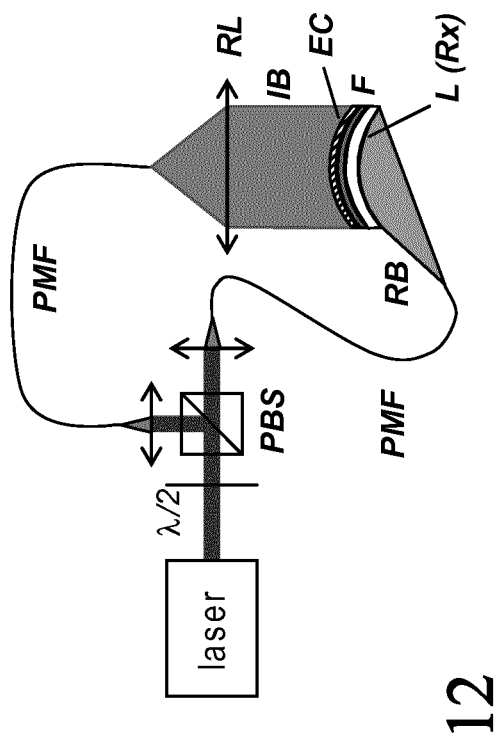
FIG. 12
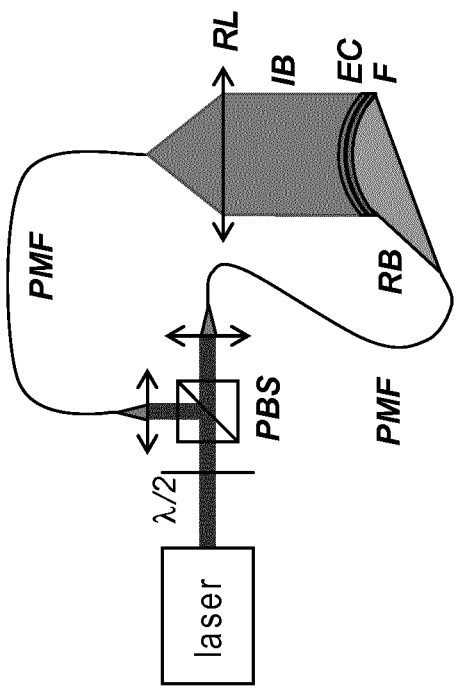
FIG. 13
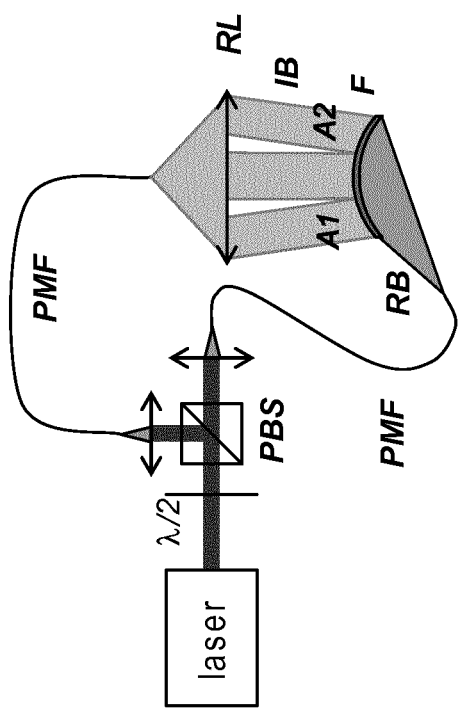

METHODS AND SYSTEMS FOR AUGMENTED REALITY

FIELD OF THE INVENTION

The invention relates to methods and systems for augmented reality.

The invention relates more particularly to the display of computer-generated images.

BACKGROUND OF THE INVENTION

Head-mounted devices with display features are known in the art. Such devices include so-called 'smart glasses', which allow the wearer thereof to visualize images or text for augmented reality.

WO 2015/032824 and WO 2015/032828 disclose head-mounted devices comprising a spatial light modulator for the display of computer-generated holographic images. In order to improve wearer visual comfort, it is desirable to provide methods and systems wherein images and text are displayed in a customized way that is specifically adapted to the wearer and/or to the worn device.

Further, for experiencing actual augmented reality, it is desirable to provide methods and systems that allow tunable visualization of computer-generated images. In particular, it is desirable that the distance and/or the direction of visualization by the wearer can be customized in a dynamic, such as time-lapse, fashion. This would provide with dynamic display of images in different gaze directions, in other terms in various positions of the vision field of the wearer, and/or provide with visualization distance (focus) dynamic adjustments. Moreover, it is desirable that augmented reality be adjusted to the wearer's vision, whether in the event of an ametropic wearer or in the event of an emmetropic wearer, possibly taking account reduced accommodation capacities. Also, it is desirable to correct, at least partially, secondary aberrations such as aspherization or field aberrations.

SUMMARY OF THE INVENTION

The present invention generally provides methods and systems for image display with a head-mounted device.

In general terms, the present invention involves the use of a see-through tunable diffractive mirror, such as a see-through tunable holographic mirror or see-through tunable LCD array mirror. Such mirror is useful for providing augmented reality.

Devices of the Invention

In one aspect, the present invention relates to a head-mounted device (HMD) intended to be worn by a wearer, wherein the head-mounted device is configured for the display and visualization, by the wearer, of computer-generated images; wherein said head-mounted device (HMD) comprises: an image source (IS), a see-through tunable diffractive mirror (M), situated in front of one eye of the wearer, and a controller configured for tuning the mirror (M); wherein the image source (IS) is configured for the emission of a light beam towards said mirror (M), wherein said emitted light beam is reflected onto said mirror (M) and thereby is directed towards said eye of the wearer, so as to cause visualization of a computer-generated image by the wearer.

In some embodiments, the mirror (M) may be tuned for adjusting at least partially the wearer's vision for the visualization of said displayed computer-generated image; for example, the mirror (M) may be tuned for: adjusting the distance of visualization of the computer-generated image by the wearer, and/or adjusting the gaze direction of visualization of the computer-generated image by the wearer, and/or adjusting the apparent size of visualization of the computer-generated image by the wearer, and/or adjusting the focal point for visualization of the computer-generated image to the position of the eye of the wearer, and/or correcting secondary optical aberrations in the visualization of the computer-generated image by the wearer, such as aspherization, field aberrations, and/or where the wearer is ametropic, correcting at least partially the wearer's ametropia for the visualization of the computer-generated image by the wearer, and/or partially or fully switching OFF or ON the visualization of the computer-generated image by the wearer.

In some embodiments, the mirror (M) comprises one or more areas of tunable refractive index/indices.

In some embodiments, the mirror (M) comprises an array of individually tunable pixels.

In some embodiments, the mirror (M) comprises an array of individually tunable recorded holographic pixels; optionally the array is an array of polymer dispersed liquid crystals (PDLC) or of holographic polymer dispersed liquid crystals (H-PDLC).

In some embodiments, the mirror (M) comprises a tunable transparent array of liquid crystal, the array is active or passive, and optionally the array is a transmission phase-only spatial light modulator (SLM).

In some embodiments, the head-mounted device (HMD) further comprises at least one sensor selected from: one or more scene cameras; one or more luminance sensors and luminosity sensors; and one or more eye-trackers.

In some embodiments, the head-mounted device (HMD) further comprises an ophthalmic lens configured for correcting at least partially the wearer's ametropia in natural vision, wherein said ophthalmic lens is selected from single-vision lenses, multifocal lenses such as bifocal lenses, progressive addition lenses and semi-finished lens blanks.

Uses and Methods of the Invention

In one aspect, the present invention relates to a use of a see-through tunable diffractive mirror (M), in a see-through head-mounted device intended to be worn by a wearer, wherein said head-mounted device comprises an image source (IS), and wherein said image source (IS) is configured for the emission of a light beam towards said mirror (M), wherein said emitted light beam is reflected onto said mirror (M) and thereby is directed towards said eye of the wearer, so as to cause visualization of a computer-generated image by the wearer, for: adjusting the distance of visualization of the computer-generated image by the wearer, and/or adjusting the gaze direction of visualization of the computer-generated image by the wearer, and/or adjusting the apparent size of visualization of the computer-generated image by the wearer, and/or adjusting the focal point for visualization of the computer-generated image to the position of the eye of the wearer, and/or correcting secondary optical aberrations in the visualization of the computer-generated image by the wearer, such as aspherization, field aberrations, and/or where the wearer is ametropic, correcting at least partially the wearer's ametropia for the visualization of the computer-generated image by the wearer, and/or partially or fully switching OFF or ON the visualization of the computer-generated image by the wearer.

In one aspect, the present invention relates to a method for the display and visualization of computer-generated images, comprising the steps of:

(a) providing a wearer with a head-mounted device (HMD) as described herein,
(b) tuning the mirror (M) so as to: adjust the distance of visualization of the computer-generated image by the wearer, and/or adjust the gaze direction of visualization of the computer-generated image by the wearer, and/or adjust the apparent size of visualization of the computer-generated image by the wearer, and/or adjust the focal point for visualization of the computer-generated image to the position of the eye of the wearer, and/or correct secondary optical aberrations in the visualization of the computer-generated image by the wearer, such as aspherization, field aberrations, and/or where the wearer is ametropic, correct at least partially the wearer's ametropia for the visualization of the computer-generated image by the wearer, and/or partially or fully switch OFF or ON the visualization of the computer-generated image by the wearer.

In some embodiments, the head-mounted device (HMD) further comprises at least one scene camera, and step (b) comprises the steps of:
(i) determining a distance and/or gaze direction of visualization, by the wearer, of an object in the natural vision field, based on data collected from the scene camera, and optionally performing a step of image recognition; and
(ii) tuning the mirror (M) so as to adjust the distance and/or gaze direction of visualization, by the wearer, of the computer-generated image, as a function of the distance and/or gaze direction determined at step (i); and
(iii) optionally, repeating steps (i) and (ii) in a time-lapse fashion.

In some embodiments, the head-mounted device (HMD) further comprises at least one luminance or luminosity sensor and optionally an electrochromic cell located in front of said eye of the wearer, and step (b) comprises the steps of:
(i) determining at least one value of luminance or of luminosity, based on data collected from the luminance or luminosity sensor, and
(ii) tuning the mirror (M) so as to adjust the gaze direction of visualization, by the wearer, of the computer-generated image, as a function of the value(s) determined at step (i), and/or optionally controlling the electrochromic cell as a function of the value(s) determined at step (i), and
(iii) optionally, repeating steps (i) and (ii) in a time-lapse fashion.

In some embodiments, the head-mounted device (HMD) further comprises at least one eye-tracker, and step (b) comprises the steps of:
(i) determining a distance and/or gaze direction of visualization, by the wearer, of an object in the natural vision field, based on data collected by the eye tracker, and
(ii) tuning the mirror (M) so as to adjust the distance and/or gaze direction of visualization, by the wearer, of the computer-generated image, as a function of the value(s) determined at step (i), and
(iii) optionally, repeating steps (i) and (ii) in a time-lapse fashion.

In some embodiments of the use or the method of the invention, the image source (IS) is configured for adjusting at least partially the wearer's vision for the visualization of said displayed computer-generated image; for example, where the wearer is ametropic, the image source (IS) may be configured for correcting at least partially the wearer's ametropia for the visualization of said displayed computer-generated image.

BRIEF DESCRIPTION OF THE DRAWINGS

FIG. 1 shows HMDs of the invention (partial views).
FIG. 4 shows possible configurations for the visualization of computer-generated images in accordance with the invention.
FIG. 8 shows principles for recording a holographic mirror (left) and utilization of the mirror by restitution of its optical function in virtual image visualization (right).
FIG. 9 shows an optical arrangement for recording a holographic mirror.
FIG. 12 shows optical arrangements for recording a holographic mirror on a lens comprising an electrochromic cell.
FIG. 13 shows an optical arrangement for recording a holographic mirror with an extended field on a lens.

DETAILED DESCRIPTION OF THE INVENTION

Definitions

Figure 3:
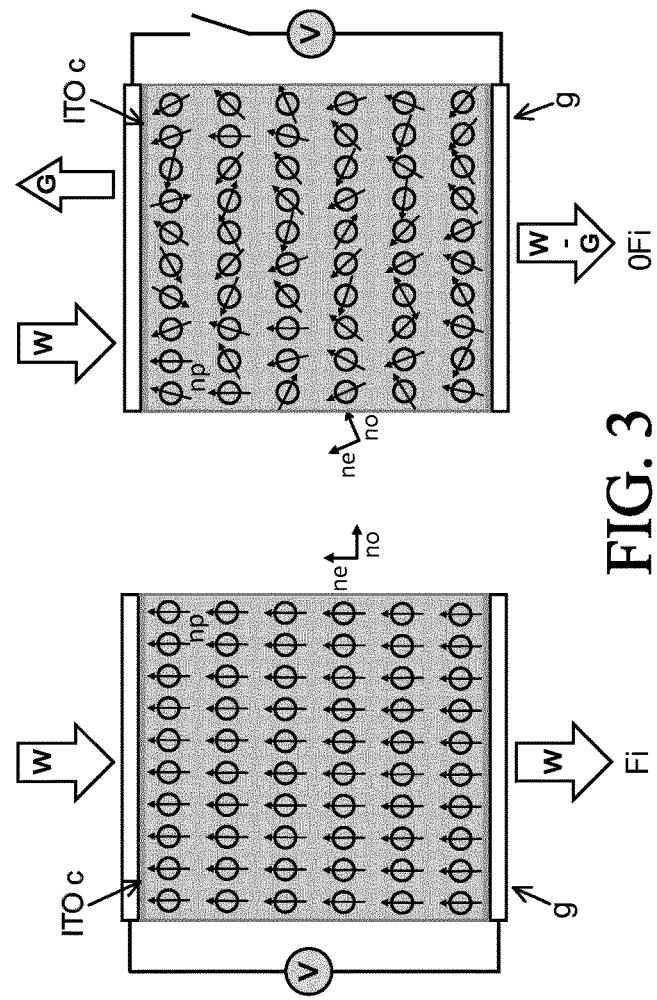
FIG. 3 shows the principle for HPDLC (holographic polymer dispersed liquid crystal).

The following definitions are provided to describe the present invention.

"Computer-generated images" are known in the art. According to the present invention, computer-generated images comprise any computer-generated images, such as 2D- or 3D-diffraction images, 2D- or 3D-computer-generated holographic images, any amplitude images etc. Computer-generated images may be used as virtual images. In some embodiments, the images (data) can be calculated in order to correct at least partially optical aberrations such as the fixed aberrations of the display (natural aberrations or linked to its orientation or position in front of the diffractive mirror), and the aberrations of the diffractive mirror used with this orientation or position of the display.

"Holographic images" are known in the art. Such holographic images can be displayed by reading (illuminating) holograms. Computer-generated holograms are also referred to as synthetic or digital holograms. Computer-generated holograms are generally obtained by selecting a 2D or 3D image, and digitally computing a hologram thereof. The holographic image can be displayed by optical reconstruction, namely by illuminating (reading) the hologram with a suitable light beam (reference beam of the hologram). Holographic images can be 2D or 3D.

"See-through diffractive mirror" (M) are known in the art. Such mirrors include holographic mirrors (HM), transparent LCD arrays (active or passive), semi-transparent mirrors, dichroic mirrors. For HMDs, these mirrors may have specific geometry to reflect the visualized image towards the eye of the wearer. The preferred example is the holographic mirror for which the specific geometry is recorded on a classical eyewear lens curve.

In accordance with the invention, the see-through diffractive mirror is tunable. This aspect is described in detail thereafter.

"Holographic mirrors" (HM) are known in the art. The mirror is defined as a holographic mirror, if it was recorded using a holography process. But according to the invention, the holographic mirror is for visualization purposes. This mirror is used to reflect a light beam generated from an image source, so as to cause the visualization of the image by the wearer. The holographic mirror is not used to reconstruct a recorded holographic image (as is the case in traditional hologram viewing). Due to the recording, advantageously according to the invention, the mirror is imparted an optical function, that is able, where applicable to modify the wavefront of the light beam stemming from the image source, upon reflection onto said mirror. This allows to correct the virtual vision of the wearer, because the lens of the invention (incorporating the mirror), can modify the light beam that generates the image in the eye of the wearer.

The virtual image is thus not necessarily a holographic image. It can be any virtual image, such as a 2D or 3D image. The nature of the image results from the nature of the image source, not from the holographic nature of the holographic mirror. It is possible to use, as an image source, a holographic image source, in which case the virtual image is a holographic image.

Such holographic mirrors are described in more detail hereinafter.

"Head-mounted display devices" (HMD) are known in the art. Such devices are to be worn on or about the head of a wearer, including helmet-mounted displays, optical head-mounted displays, head-worn displays and the like. They include optical means for displaying an image for visualization by the wearer. The HMD may provide for the superimposed visualization of a computer-generated image and of a 'real-life' vision field. The HMD may be monocular (single eye) or binocular (both eyes). The HMD of the invention can take various forms, including eyeglasses, masks such as skiing or diving masks, goggles, etc. The HMD may comprise one or more lenses. Said lenses can be selected from ophthalmic lenses, such as prescription lenses. In preferred embodiments, the HMD is a pair of eyeglasses provided with lenses.

"Image sources" (IS) are known in the art. An image source is any light source that can emit a light beam suitable (arranged, configured) for displaying the image for visualization by the wearer. Visualization occurs after the illumination beam stemming from the image source is reflected onto the see-through mirror. Regarding display of holographic images, the light beam comprises the reference beam for the hologram. The image can be displayed from image data (for example computer-generated image data).

According to the invention, the IS may also have a multi stack structure.

According to the invention, the IS may be "off-axis", in that it may be located next to the temple of the wearer, for example on the temple component of the HMD, such as a temple component of spectacles.

According to the invention, the IS may be any image source configured for the display of virtual images (computer-generated images). It may be a screen (for example OLED, LCD, LCOS, etc.), a phase and/or amplitude SLM (Spatial Light Modulator) taken in combination with its light source (for example laser, diode laser, etc.), a projector such as a picoprojector (MEMS or DLP, that may use LEDs, diodes lasers, etc.), or any other source. The IS may also include any other image source (computer-generated image source), and/or control electronics and/or power supply and/or optional optical elements, etc.

"Spatial light modulators" (SLM) are known in the art. Said SLM can be a phase SLM, a phase-only SLM, an amplitude-only SLM, or a phase and amplitude SLM. Where present, the amplitude modulation is preferably independent from the phase modulation, and allows for a reduction in the image speckle, so as to improve image quality in terms of grayscale.

"Wearer ophthalmic data" or "ophthalmic data" (OD) are known in the art. Wearer ophthalmic data include wearer prescription data (PD), wearer eye sensitivity data (SD) and wearer ophthalmic biometry data (BD), and generally data pertaining to any wearer vision defect, including for example data pertaining to chromatic aberrations, lack of eye lens (aphakia), etc.

"Prescription data" (PD) are known in the art. Prescription data refers to one or more data obtained for the wearer and indicating for each eye a prescribed far vision mean refractive power $P_{FV}$, and/or a prescribed astigmatism value $CYL_{FV}$ and/or a prescribed astigmatism axis $AXE_{FV}$ and/or a prescribed addition A suitable for correcting the ametropia and/or presbyopia of each eye. The mean refractive power $P_{FV}$ is obtained by summing the half value of the prescribed astigmatism value $CYL_{FV}$ to the prescribed sphere value $SPH_{FV}$: $P_{FV}=SPH_{FV}+CYL_{FV}/2$. Then, the mean refractive power for each eye for proximate (near) vision is obtained by summing the prescribed addition A to the far vision mean refractive power $P_{FV}$ prescribed for the same eye: $P_{NV}=P_{FV}+A$. In the case of a prescription for progressive lenses, prescription data comprise wearer data indicating for each eye values for $SPH_{FV}$, $CYL_{FV}$ and A. In preferred embodiments, wearer prescription data PD are selected from astigmatism module, astigmatism axis, power, prism and addition, and more generally any data indicating the correction of any given vision defect. Such defect may result from a partial retinal detachment, retina or iris or cornea malformation, "Wearer eye sensitivity data" (SD) are known in the art. Wearer eye sensitivity data include data for spectral sensitivity (to one or more wavelengths or spectral bands); general sensitivity such as brightness sensitivity, for example for outdoors brightness sensitivity. Such data are of importance to optimize contrast for visualization of an image by the wearer.

"Wearer ophthalmic biometry data" or "biometry data" (BD) are known in the art. Biometry data include data pertaining to the morphology of the wearer, and typically include one or more of monocular pupillary distance, inter-pupillary distance, axial length of the eye, position of the centre of rotation of the eye, punctum remotum, punctum proximum, etc.

Tunable Mirror

The present invention relates to the use of a see-through tunable diffractive mirror in a HMD. The mirror is for the visualization of computer-generated images.

The mirror used in accordance with the invention is tunable, in that one or more of its optical properties, for one or more parts or areas of said mirror, can be tuned. This means that said one or more optical properties can be adjusted, activated, deactivated, switched (ON or OFF), and/or synchronized with the image source, etc.

Optical properties include optical index value, phase, reflectivity (value, angle, wavelengths or spectral curve), transmittance, etc.

Head-Mounted Devices of the Invention

In one aspect, the invention provides a head-mounted device comprising an image source, a see-through tunable diffractive mirror, and a controller configured for tuning the mirror; wherein the image source is configured for the emission of a light beam towards said mirror, wherein said emitted light beam is reflected onto said mirror and thereby is directed towards said eye of the wearer, so as to cause visualization of a computer-generated image by the wearer.

The mirror is located off axis with respect to the IS. This is illustrated by FIG. 1, showing the mirror M, such as a holographic mirror HM. The image source IS is located on the temple of an HMD in the form of spectacles. The IS may also include a deflector (e.g. holographic deflector, H defl).

The M may be provided on the front face, or rear face, or in the bulk of an ophthalmic lens. The lens may be any type of lens, preferably a prescription lens.

The M may also define various vision zones, whether in terms of gaze directions (e.g. up, down, left, right) or in terms of vision (near vision, far vision, intermediary vision, central vision, peripheral vision) or in terms of distance of visualization. The HM may be configured so as to take into account the wearer's ametropia or ophthalmic data, including prescription data. Advantageously according to the invention, the tunable mirror makes it possible to differentially tune one or more zones (e.g. sequentially and/or according to prescription data; for example NV vs. FV). This may also be performed in a time lapse fashion, e.g. activate zone 1 only, and then deactivate zone 1 while activating zone 2. It is thus possible to tune one or more zones selectively, e.g. successively or only some simultaneously. See FIG. 7.

In some embodiments, the mirror is a holographic mirror HM. This HM may be as described herein. Said HM may be configured so as to correct, at least partially, the wearer's vision. This includes possible visions defects, such as ametropia and/or lack of accommodation reserve. In particular, the HM may be configured so as to take into account the wearer's ophthalmic data OD, such as prescription data PD.

Thus, advantageously according to the invention, the see-through mirror and/or the image source is/are configured for adjusting at least partially the wearer's vision for the visualization of said displayed computer-generated image. Notably, where the wearer is ametropic, the see-through mirror and/or the image source may be configured for correcting at least partially the wearer's ametropia for the visualization of said displayed computer-generated image. In some embodiments, correcting the vision includes correcting ametropia and/or minimizing accommodation. In some embodiments, correcting the vision is achieved through the configuration of the see-through mirror and/or the configuration of the image source and/or of the image calculation (computer-generated image data inputted into the image source). See WO 2015/032828.

In accordance with the invention, the mirror (M) may be tuned for adjusting at least partially the wearer's vision for the visualization of said displayed computer-generated image. The mirror may for example be tuned for:

adjusting the distance of visualization of the computer-generated image by the wearer, and/or adjusting the gaze direction of visualization of the computer-generated image by the wearer, and/or adjusting the apparent size of visualization of the computer-generated image by the wearer, and/or adjusting the focal point for visualization of the computer-generated image to the position of the eye of the wearer, and/or correcting secondary optical aberrations in the visualization of the computer-generated image by the wearer, such as aspherization, field aberrations, and/or where the wearer is ametropic, correcting at least partially the wearer's ametropia for the visualization of the computer-generated image by the wearer, and/or partially or fully switching OFF or ON the visualization of the computer-generated image by the wearer.

In some embodiments, the mirror (M) may comprise one or more areas of tunable optical properties, such as value of refractive index/indices, phase, reflectivity (value, angle, wavelengths or spectral curve), transmittance, etc. If the mirror comprises one area of tunable optical property, this one area may be the entire mirror or a sub-area thereof. The mirror may also comprise a plurality of tunable areas. Said area may advantageously be configured so as to be tunable individually (separately, independently from each other). In some embodiments, the area(s) of the mirror may correspond to one or more given vision zones. The vision zone(s) may be defined in terms of gaze directions (e.g. up, down, left, right), in terms of vision (near vision NV, far vision FV, intermediary vision IV, central vision, peripheral vision, etc.) or in terms of distance of visualisation. As described above, advantageously according to the invention, the tunable mirror makes it possible to differentially tune one or more zones/areas thereof.

In some embodiments, the mirror (M) comprises an array of individually tunable pixels. In some embodiments, one or more or all of said pixels is recorded (fixed function) but can be switched ON or OFF.

In some embodiments, mirror pixels may be grouped by pixel subsets, so as to define mirror areas. Said areas may correspond to vision zones as described above.

In some embodiments, it is possible to stack multiple mirror layers. This is advantageous, in that it offers the possibility to superimpose various functions over a given area of the mirror. The layers (and/or sub-areas thereof) may be configured tunable individually (separately, independently from each other).

In some embodiments, the mirror (M) may comprise one or more holographic mirror (HM) and/or one or more LCD array.

In some embodiments, the mirror (M) comprises an array of individually tunable recorded holographic pixels. For example, the array may be an array of polymer dispersed liquid crystals (PDLC) or of holographic polymer dispersed liquid crystals (H-PDLC). In such embodiments, the pixel size may be at least 50 μm.

In some embodiments, the mirror (M) comprises a tunable transparent array of liquid crystal. The array is active or passive. For example, the array may be a transmission phase-only spatial light modulator (SLM). In such embodiments, the pixel size may be of <5 µm. The pixels are not necessarily identical and/or have a regular form or pattern.

These patterns and/or forms can be random and/or regular (square, hexagonal, etc.). One or more or all pixels may be controllable using a controller.

In some embodiments, the HMD may comprise at least one smart sensor. For example, it may comprise at least one sensor selected from scene cameras, luminance sensors and luminosity (light, brightness) sensors, and eye-trackers.

The HMD of the invention may comprise one or more smart sensors.

In some embodiments, the HMD of the invention may comprise one or more scene cameras, e.g. a light-field camera or a fish-eye camera or a standard camera. The camera may have a broad field aperture; it may be a plenoptic camera.

Where the HMD comprises a camera, it makes it possible to detect an item in a scene (including determine distance and/or gaze direction for viewing a real-life item); and then display one or more computer-generated images in the same or in a different gaze direction; and/or at the same or at a different visualization distance. For example, when the wearer views a picture in the museum, the camera detects the distance and gaze direction for viewing the picture (real life), and accordingly provides information for displaying information on the picture just below the picture, and at the same (or different) distance of visualization, e.g. corresponding to vision zones as described above. The displayed information may contain a tag, information, a picture, the name of the painter (augmented reality).

In some embodiments, the HMD of the invention may comprise one or more luminance sensors and/or luminosity sensors (brightness sensor), e.g. an ALS=ambient light sensor, a photodiode, or a broad field aperture or a plenoptic camera, etc.

Where the HMD comprises a luminance sensors and/or luminosity sensor, it makes it possible to detect vision zones that are darker than others. This makes it possible to elect to display information (computer-generated image) in a darker area of the M, HM, e.g. corresponding to vision zones as described above. This advantageously enhances vision due to improved contrast. It is also possible that the brightness sensor be used so as to detect situations wherein the computer-generated image display is entirely switched off (e.g. situations of very high brightness).

In some embodiments, the HMD of the invention may comprise one or more eye-trackers, e.g. IR trackers or (IR) mirror or camera.

Where the HMD comprises one or more eye-trackers, it makes it possible to detect vision zones that are being used by the wearer (detect gaze directions). This makes it possible to elect to display information (computer-generated image) in or outside a given area of the M, HM, e.g. corresponding to vision zones as described above. In such case, the HMD of the invention may further comprise an electrochromic cell (EC). The EC cell may be present in or on a lens in the HMD. The EC cell may then advantageously be used to darken the lens, so as to enhance vision contrast and improve visualization of the computer-generated image by the wearer.

In some embodiments, the HMD may comprise one or two ophthalmic lenses. Said ophthalmic lens may be configured for correcting at least partially the wearer's ametropia in natural vision, wherein said ophthalmic lens is selected from single-vision lenses, multifocal lenses such as bifocal lenses, progressive addition lenses and semi-finished lens blanks. Said ophthalmic lens may be prescription lens.

In such case, the mirror may be provided on the front face or rear face or within the bulk of the lens. Advantageously, according to the invention, the mirror is see-through and thus does not substantially affect natural vision (does not substantially affect the optical function of the ophthalmic lens), independently of the tune state of the mirror.

Uses and Methods of the Invention

According to the invention, the see-through tunable diffractive mirror can be used for:
  adjusting the distance of visualization of the computer-generated image by the wearer, and/or
  adjusting the gaze direction of visualization of the computer-generated image by the wearer, and/or
  adjusting the apparent size of visualization of the computer-generated image by the wearer, and/or
  adjusting the focal point for visualization of the computer-generated image to the position of the eye of the wearer, and/or
  correcting secondary optical aberrations in the visualization of the computer-generated image by the wearer, such as aspherization, field aberrations, and/or
  where the wearer is ametropic, correcting at least partially the wearer's ametropia for the visualization of the computer-generated image by the wearer, and/or
  partially or fully switching OFF or ON the visualization of the computer-generated image by the wearer.

In one aspect, the invention provides a method for the display and visualization of computer-generated images, comprising the steps of:
(a) providing a wearer with a head-mounted device (HMD) as described herein,
(b) tuning the mirror (M) so as to:
  adjust the distance of visualization of the computer-generated image by the wearer, and/or
  adjust the gaze direction of visualization of the computer-generated image by the wearer, and/or
  adjust the apparent size of visualization of the computer-generated image by the wearer, and/or
  adjust the focal point for visualization of the computer-generated image to the position of the eye of the wearer, and/or
  correct secondary optical aberrations in the visualization of the computer-generated image by the wearer, such as aspherization, field aberrations, and/or
  where the wearer is ametropic, correct at least partially the wearer's ametropia for the visualization of the computer-generated image by the wearer, and/or
  partially or fully switch OFF or ON the visualization of the computer-generated image by the wearer.

In some embodiments, the head-mounted device (HMD) further comprises at least one scene camera, and step (b) comprises the steps of:
(i) determining a distance and/or gaze direction of visualization, by the wearer, of an object in the natural vision field, based on data collected from the scene camera, and optionally performing a step of image recognition; and
(ii) tuning the mirror (M) so as to adjust the distance and/or gaze direction of visualization, by the wearer, of the computer-generated image, as a function of the distance and/or gaze direction determined at step (i); and
(iii) optionally, repeating steps (i) and (ii) in a time-lapse fashion.

In step (ii), the distance and/or gaze direction for the visualization, by the wearer, of the computer-generated image, may respectively be equal or not to that of the distance and/or gaze direction of visualization, by the wearer, of an object in the natural vision field from step (i).

Step (iii) provides for enhance augmented reality experience, since the information can be collected time-lapse, so as to update the display as a function of time, for example if the wearer changes gaze directions, and/or turns the head, and/or the object in the natural vision field is moving.

In some embodiments, the head-mounted device (HMD) further comprises at least one luminance or luminosity sensor and optionally an electrochromic cell located in front of said eye of the wearer, and step (b) comprises the steps of:
(i) determining at least one value of luminance or of luminosity, based on data collected from the luminance or luminosity sensor, and
(ii) tuning the mirror (M) so as to adjust the gaze direction of visualization, by the wearer, of the computer-generated image, as a function of the value(s) determined at step (i), and/or optionally controlling the electrochromic cell as a function of the value(s) determined at step (i), and
(iii) optionally, repeating steps (i) and (ii) in a time-lapse fashion.

Step (ii) allows the control (tuning/adjustment) of contrast for visualization of the computer-generated image by the wearer. Step (iii) provides for enhanced augmented reality experience, since the information can be collected timelapse, so as to update the display as a function of changes in ambient luminosity.

In some embodiments, the head-mounted device (HMD) further comprises at least one eye-tracker, and step (b) comprises the steps of:
(i) determining a distance and/or gaze direction of visualization, by the wearer, of an object in the natural vision field, based on data collected by the eye tracker, and
(ii) tuning the mirror (M) so as to adjust the distance and/or gaze direction of visualization, by the wearer, of the computer-generated image, as a function of the value(s) determined at step (i), and
(iii) optionally, repeating steps (i) and (ii) in a time-lapse fashion.

This makes it possible to select and use different vision zones as described above.

In some embodiments, the image source may be configured so that the image source is used to adjust the distance of visualization, while the mirror is used to adjust the gaze direction of visualization.

In some embodiments, the image source (IS) is configured for adjusting at least partially the wearer's vision for the visualization of said displayed computer-generated image, for example, where the wearer is ametropic, the image source (IS) may be configured for correcting at least partially the wearer's ametropia for the visualization of said displayed computer-generated image.

Holographic Mirrors to be Implemented in Accordance with the Invention

Optical Properties of a Holographic Mirror

Holography techniques are known in the art. They generally involve first a step of recording on a suitable medium such as a holographic support, and then a step of reconstructing the holographic image. Recording generally involves dual illumination of the medium with a reference beam RB and an illumination beam IB. Reconstructing the holographic image can be performed by illuminating the recorded medium with the reference beam RB.

In broad terms, for providing a holographic mirror HM, the present invention implements a recording step, but does not involve the reconstructing step as described above. Reference is generally made to examples depicted at FIGS. 2, 8 and 10.

Figure 2:
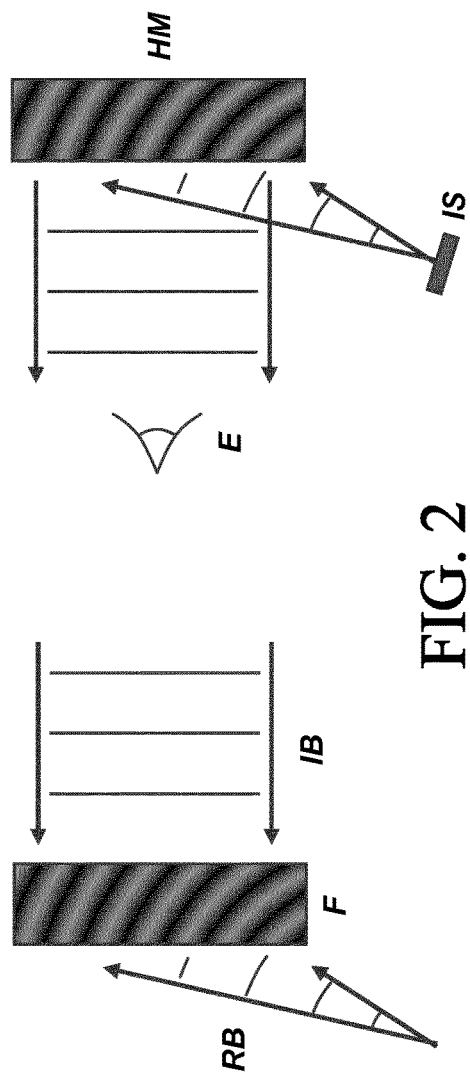
FIG. 2 shows principles for recording a holographic mirror (left) and utilization of the mirror by restitution of its optical function in virtual image visualization (right).

The principle for the mirror is as follows (this is for the purpose of illustrating a situation wherein the wearer is emmetropic and the visualized image is located at infinite distances. A mirror is recorded using a conventional holographic recording setting (optical arrangement), see FIG. 2 left. The mirror reflects the image displayed on the screen (image source). This screen is relatively close to the glass and forms an angle with respect to it. It is simulated by a divergent wave (beam) stemming from the actual distance and actual inclination of the screen. The image that is to be displayed is situated at infinity, in a direction perpendicular to the glass. The second interference beam is a plane wave in a direction perpendicular to the glass. When the screen is positioned, the image will be displayed at infinity and visible to the wearer as shown in FIG. 2 right (restitution of the hologram). The interference fringes between the two beams are recorded in the photosensitive material in the form of an index grating. This index grating reflects the optical function that is to be implemented.

This index grating can also be implemented with a material other than photosensitive materials. Liquid crystals are well known to have orientations and phases with different index values. It is thus possible to achieve this index grating through a liquid crystal matrix (array), as is performed for digital holography. The function is activated and then visible by reading with the optical display source.

Depending on the situation and/or for application in time-lapse (real-time), it may be of interest to change one or more of the following parameters:
 The area of the mirror where the image source beam is reflected, corresponding to the area where the image is displayed,
 The focus distance (possibly taking into account the ophthalmic data of the wearer),
 The reflection angle of the image, so as to provide a gaze direction according to the orientation axis of the eye,
 It is also possible to modify cell characteristics globally or locally (most versatile). It is also possible to define separate areas (VP, VL, for example) with various values of focus distance or different angles of reflection (gaze directions).

Recording of a Holographic Mirror

In order to obtain a HM to be implemented according to the invention, a recording step is used so as to record (impart) an optical function in a film F of holographic material. The resulting (recorded film) is a mirror that is used to reflect a beam from the image source, so as to cause visualization of a virtual image by the wearer.

Figure 10:
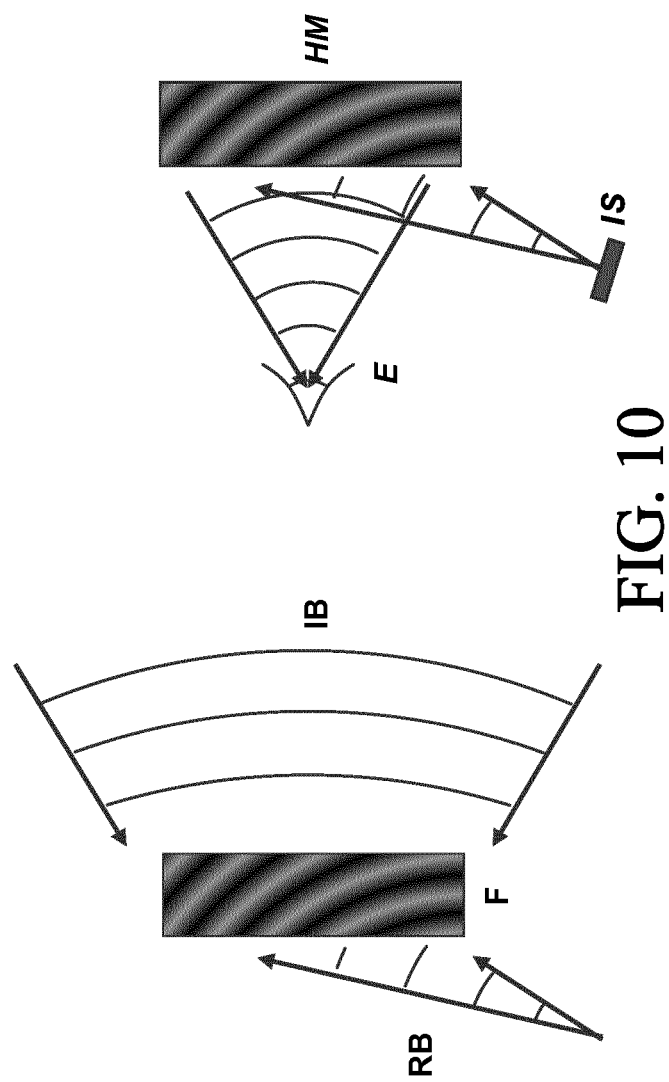
FIG. 10 shows principles for recording a holographic mirror (left) and utilization of the mirror by restitution of its optical function in virtual image visualization (right).

This is illustrated by FIG. 8 and FIG. 10 wherein the holographic medium is a holographic mirror: the left part shows medium recording and the right part shows visualization of the virtual image (from the image source) by the wearer. An image source IS provides a beam that illuminates the holographic mirror. The beam from the IS is reflected onto the mirror towards an eye of a subject. In FIG. 8, the virtual image to be visualized is situated at infinite (or very large) distance of the wearer. FIG. 10 illustrates visualization of the virtual image in a situation of pupil conjugation. The virtual image is formed on the eye pupil.

In some embodiments, the HM may be configured so as to provide multiple vision zones and/or so as to at least partially correct the wearer's vision. In particular, where the wearer is ametropic, the HM may be configured to at least partially correct the wearer's vision.

Such HM may be obtained as described in EP 15 305 504.1 filed on Apr. 3, 2015, the entire contents of which are herein incorporated by reference. See also below.

Materials for Preparing a Passive Holographic Mirror; Films of Holographic Materials Such mirrors can be obtained from specific materials such as dichromated gelatins or photopolymers. Photopolymers can be in any physical state (liquid, solid, paste, etc.) and include those solid and those liquid under standard conditions. The mirror function is holographically recorded in the specific material.

Photopolymer formulations contain generally one or more monomers or oligomers presenting at least an ethylenically unsaturated photo polymerizable part and at least a system of photo-initiation of polymerization with at least one component that is sensitive to the illumination wavelength. They can contain a combination of a photoinitiator and a photo-sensitizer that allow the increase of the range of the spectral sensitivity for visible light. These photopolymer formulations can contain various additives such as, in a not exhaustive list, polymers, solvents, plasticizers, transfer agents, surfactants, anti-oxidizing agents, thermal stabilizers, anti-foaming agents, thickeners, levelling agents, catalysts and so on. Examples of photopolymers include commercial photopolymers, such as OmniDex (E.I. du Pont de Nemours (EP 0377182 A2)), Bayfol HX (Bayer), Darol (Polygrama) or SM-TR Photopolymer (Polygrama).

Depending on their composition, in particular on the presence or not of solvents and on their viscosity, different types of processing can be envisaged. The thickness of the photopolymer layer may be from 1 to 100 µm and preferentially from 4 to 50 µm.

The formulations containing solvents can be processed in different ways, for example by spin coating, dip coating spray or bar coating of a plane substrate of glass (mineral or organic), or by spin coating, dip coating or spray coating on a curved substrate of glass (mineral or organic) in order to obtain the desired thickness. After coating, a step of evaporation of the solvent(s) is generally necessary to obtain the layer of photopolymer ready to be recorded.

When the formulations do not contain solvents, they can be used in the same way if their viscosity is not too high. In this case the evaporation step is not necessary. Nevertheless a preferred method consists in the direct encapsulation of the photopolymers between two glass plates (mineral or organic), with a plane or curved shapes.

Two methods can be used in this case. In the first one, the quantity of liquid required for a thickness from 5 to 50 µm, depending on the photopolymer, is deposited on the glass plate. The liquid contains spacers made of glass or polymer, of diameter from 5 to 50 µm adapted to the final desired thickness. The second glass plate is placed on the liquid drop. It allows the spreading and the confinement of the photopolymer. After exposition and polymerization the photopolymer is solid (or at least gellified) and it attaches the two glass plates together. A peripheral sealing is then performed to protect the edge of the photopolymer from contacts with liquids or atmosphere that may damage it along the time.

In the second method, a cell is assembled with two plates of glass (plane or curved) and sealed all along the periphery except at a hole that allows the filling of the cell with the liquid photopolymer. The filling can be performed by putting the cell under low pressure or vacuum and plunging it in the photopolymer. The hole is then sealed with organic glue, for example glue that polymerizes under UV or thermal treatment.

Another method comprises:
the deposition of the photopolymer on a flexible substrate, like a polymer film, polyester for example,
the removal of eventual solvents by evaporation or heating,
the transfer of the film coated by the photopolymer onto a substrate (mineral or organic) with plane or curved shape using well-known transfer processes and adapting them to used materials (film and photopolymer) (for example ESSILOR patent applications WO2007144308 A1, WO2010010275 A2). The photopolymer can be, in this case, at the surface of the transferred film or in contact with the substrate.

After deposition of the photopolymer and before its exposure, one needs to let it rest during typically 15 minutes to 2 hours. The stress linked to the process of deposition disappears during this time. After the recording of the holographic mirror, a post-exposition under UV is performed to polymerize the residual monomers.

The photopolymer layers can be coloured with photo-sensitizers that absorb a part of the visible light. These photo-sensitizers are preferentially chosen to lose completely their colour after exposition to the visible light. A post-exposition under UV or white light reduces the residual absorption.

A thermal treatment can be realised depending on the used materials to increase the refractive index modulation of the hologram and its diffraction efficiency.

In some embodiments, said holographic mirror (HM) (respectively, said film (F) of unrecorded holographic medium) is provided on the front surface of an ophthalmic lens, on the rear surface of an ophthalmic lens, or between the front surface and the rear surface of an ophthalmic lens. Said ophthalmic lens may be selected from single-vision lenses, multifocal lenses such as bifocal lenses and progressive addition lenses, and semi-finished lens blanks.

Possible Materials and Structures of the Tunable Mirror

According to the invention, it is possible to use various structures for the tunable mirror. These structures may also be combined with each other and/or combined with a passive (non-tunable) mirror.

Tunable Holographic Mirrors

In one aspect, the mirror is formed of one or more zones wherein a hologram is registered, wherein said hologram can be tuned (e.g. deactivated). These zones may range from the entire mirror surface to one or more small pixels. The number of fringes recorded in the pixel should be such that the mirror function is effective. For example, based on a hundred fringes, one may use a pixel size of 50 microns or more. The function of each pixel is recorded, but can be tuned or not. Said individual function is set, but combinations (groups) of pixels, corresponding to groups of "microscopic" holographic functions, can be used to achieve different "macroscopic" functions. In addition to these combinations, for example if the zones are large, it is possible to have several zones with different functions stored (recorded) in each area, which may be configured so as to be tuned individually. It is also possible to implement multiple layers so as to superimpose features on the same area, wherein each layer may be tuned separately.

In one aspect, the invention may rely on the principle of PDLC (Polymer Dispersed Liquid Crystal). A reactive monomer is mixed with molecules forming a liquid crystal phase. When the mixture is irradiated, the monomers polymerize and trap liquid crystal droplets. The exposure is generally in the UV wavelengths. The layer becomes very light diffusing, because the liquid crystal is oriented in multiple directions within the polymer. As a consequence, there is provided a difference in refractive index between the polymer matrix and the liquid crystal domains due to the birefringence thereof. When applying an electric field, the liquid crystals are oriented perpendicularly to the conductive substrate. In this configuration, incident light perpendicular to the liquid crystal may have its index of refraction match (equal) to that of the polymer, so that the system appears transparent. The PDLC thus makes it possible to switch between a state of diffusing system and a state of a transparent system.

In the case of holography (HPDLC), the principle is the same, wherein the monomer reacts at the laser wavelength with which it is irradiated. The laser provides two interfering beams, and the generated interferences are stored in the recorded holographic mirror. The polymerized monomers are therefore found in the areas where interference is constructive. This provides areas of high concentration of polymer and other areas of high concentration of liquid crystals. The hologram is thus formed due to their index difference. When an electric field is then applied, the liquid crystals are oriented and the index difference becomes zero, so that the system becomes transparent (See FIG. 3: ITO c: ITO conductor: transparent conductive coating such as Indium Tin Oxide (ITO); g: glass; W: white light; G: green light; V: voltage: Fi (box at left): an electric field is applied to the H-PDLC, the system is in a transparent state; 0Fi (box at right): zero electric field is applied, the system is in a Bragg reflecting state; $n_p$: refractive index of polymer; $n_e$, $n_o$: refractive indices of the liquid crystal).

The materials used to make these HPDLC may be acrylate monomers mixed with liquid crystal formulations. The liquid crystals may be selected so that they have high birefringence to obtain increased contrast. The dielectric anisotropy of the liquid crystal may also be selected to allow activation with lower values of electric fields. The photo-initiators may have an absorption spectrum in the visible so as to respond to standard laser wavelengths. Surfactants may be added to improve the liquid crystal orientation and reduce the useful electrical field to orient them. The voltage to be used for switching the HPDLC may be of 20 to 150V depending on the type of material, the thickness of the layer (e.g. between 5 and 20 microns). The index delta may be $\Delta n/3$. For example, for some liquid crystals, $\Delta n$ may be in the range of 0.2 to 0.5, for example it may be about 0.4.

Below is provided an illustrative example of composition:
trimethylolpropane triacrylate (TMPTA) as a main monomer,
N-vinylpyrrollidone (NVP) as binding monomer,
rose bengal (RB) as photoinitiator,
N-phenylglycine (NPG) as coinitiator
S-271 POE sorbitan monooleate as surfactant
liquid crystal E7.

In one aspect, it is possible to prepare the HPDLC in "reverse" mode. If the polymer is 'matched' with the liquid crystal in the OFF state, then, when the voltage (electric field) is applied, the liquid crystals become oriented, and according to this orientation their index differs from that of the polymer, so that the hologram may be displayed. In this case one can for example use a polymer liquid crystal (e.g. RM 252 available from Merck) and a nematic liquid crystal with positive dielectric anisotropy whose indices correspond therewith. One can also use a polymer which has no liquid crystal phase and in this case use of nematic liquid crystal with a negative dielectric anisotropy (with a homeotropic alignment at the start). These embodiments are described in the U.S. Pat. No. 6,133,971.

Thiolene and epoxy can also be used instead of acrylate monomer. Liquid crystals with high birefringence are preferred, for example: BLO37 from Merck—birefringence=0.282

Tunable LCD Arrays

In one aspect, the mirror is a liquid crystal matrix (array) that may be active or passive. This matrix is similar to the matrices used for making an SLM, except that it may not necessarily be an active matrix. A passive matrix may be used for simple functions, having an axis or a center of symmetry. An active matrix provides for more varied applications and mirror management (control, tuning). The display of the index matrix is similar to that of a transmissive SLM. See for example U.S. Pat. Nos. 5,548,301, 7,742,215, 7,154,654).

Because the mirror is see-through, the LC array is transparent. It is preferable to have a pixel size of less than 5 microns to improve visual comfort. It is also possible to render the matrix see-through using other methods, including the use of a random pattern instead of a regular pattern. It is also possible to use a LC single cell, therefore non-pixel separated by walls, and to spatially manage the electric field applied to activate orientation of the liquid crystal.

Recording a Holographic Mirror

The recording of a mirror can be performed in accordance with an optical arrangement. An exemplary optical arrangement is shown on FIG. 9. On this figure, the recording implements a laser. A polarization beam splitter PBS allows to 'divide' the beam. References signs PMF are polarization-maintaining fibers. The split of the beam provides for two beams: a reference beam RB illuminating one side of a holographic recording medium, and an illumination beam IB illuminating the other side of the holographic medium. This allows the recording of a holographic mirror HM. Once the optical arrangement is set (e.g. geometry, sizes of the beams, etc.), features of the holographic mirror can be modified by varying one or more parameters, including the power ratio between the two beams (impacts the fringe contrast and the diffraction efficiency), the exposure time (impacts the diffraction and diffusion efficiency), and the possible use of rotatable supports for the ends of the fibers (impacts the polarization of the beams when exiting the PMF fibers). Examples of parameters for an optical arrangement and recording are provided at Example 4.

Holographic Mirror Provided on an Ophthalmic Lens; Ametropia Correction

In some embodiments, the HMD comprises one or more ophthalmic lenses, and the HM is provided in/on one or more of said lenses. In such embodiments, the HM may be obtained in accordance with the following method (reference is generally made to non-limiting examples depicted on FIG. 11-14):

(1) providing an ophthalmic lens having a front surface and a rear surface, wherein said ophthalmic lens comprises a film (F) of unrecorded holographic medium, wherein said ophthalmic lens optionally further comprises an amplitude modulation cell, for example selected from electrochromic cells, polarizing cells and photochromic cells, (2) performing holographic recording of said holographic medium by generating interference between a reference beam (RB) and an illumination beam (IB) so as to provide an ophthalmic lens comprising a holographic mirror (HM), wherein the holographic recording is performed in an optical arrangement that takes into account at least the (spatial) configuration of the frame of the HMD, and (3) optionally cutting the lens obtained from step (2).

Advantageously according to step (2), the configuration of the RB mimics (simulates) the configuration of the IS on the frame, with respect to the HM in the lens fitted into the frame. In particular, the spatial configuration of the RB reflects the spatial configuration implemented for recording the mirror once the lens is fitted into the frame (orientation, distance, breadth (shape and size of zone projected on the lens), etc.). The physical location of the image source IS build-in on the frame may thus further define a secondary (re-imaged) corresponding image source. Thus, the configuration of the IB may reflect emission from the physical image source IS, or from a secondary (re-imaged) image source.

Advantageously, the optical arrangement of step (2) allows to provide with a holographic mirror that leads to the desired optical function, namely the holographic mirror obtained by step (2) is 'automatically' configured for providing the suitable optical function for at least partially correcting the wearer's ametropia for virtual vision through the lens.

Figure 11:
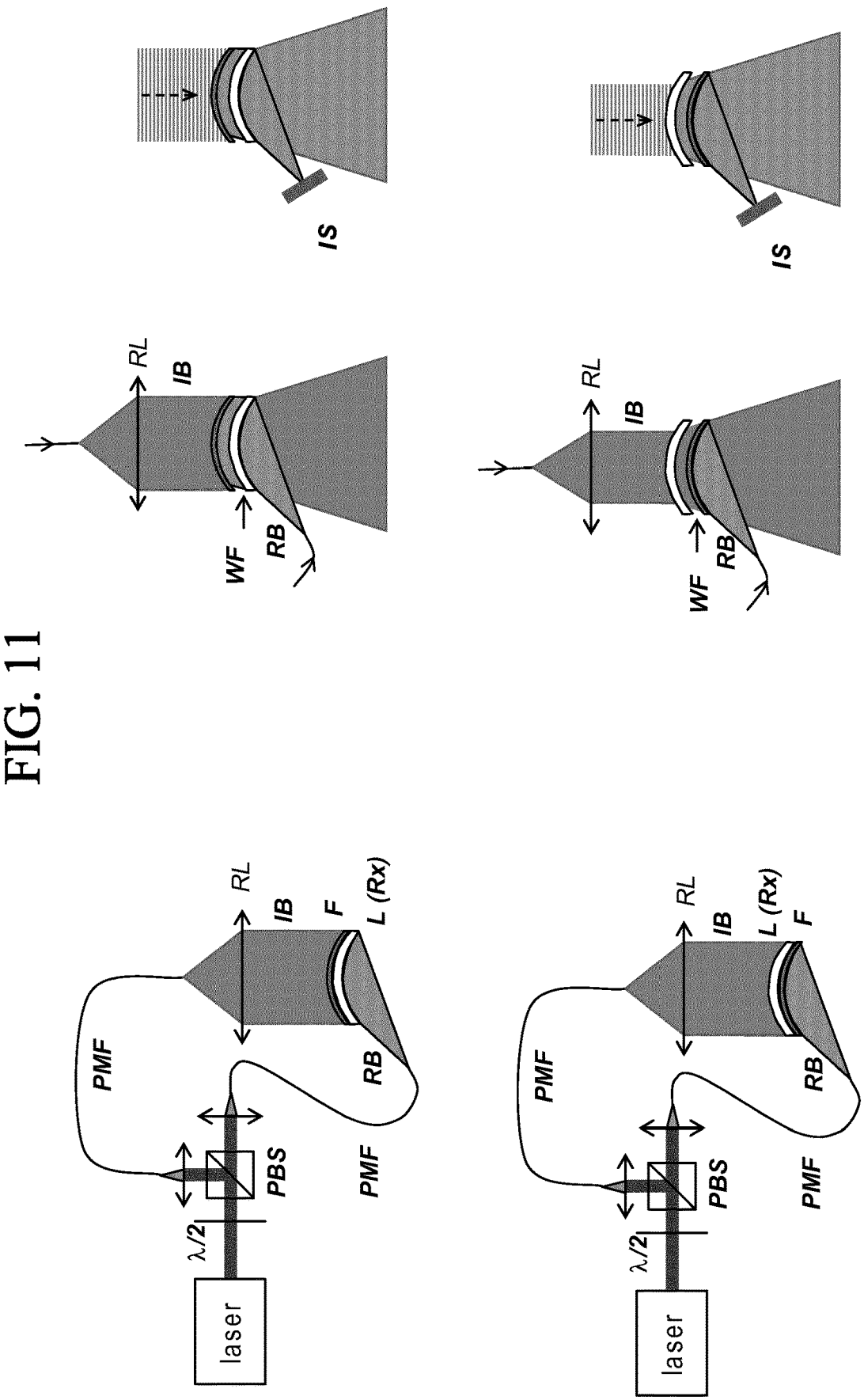
FIG. 11 shows optical arrangements for recording a holographic mirror.
Figure 14:
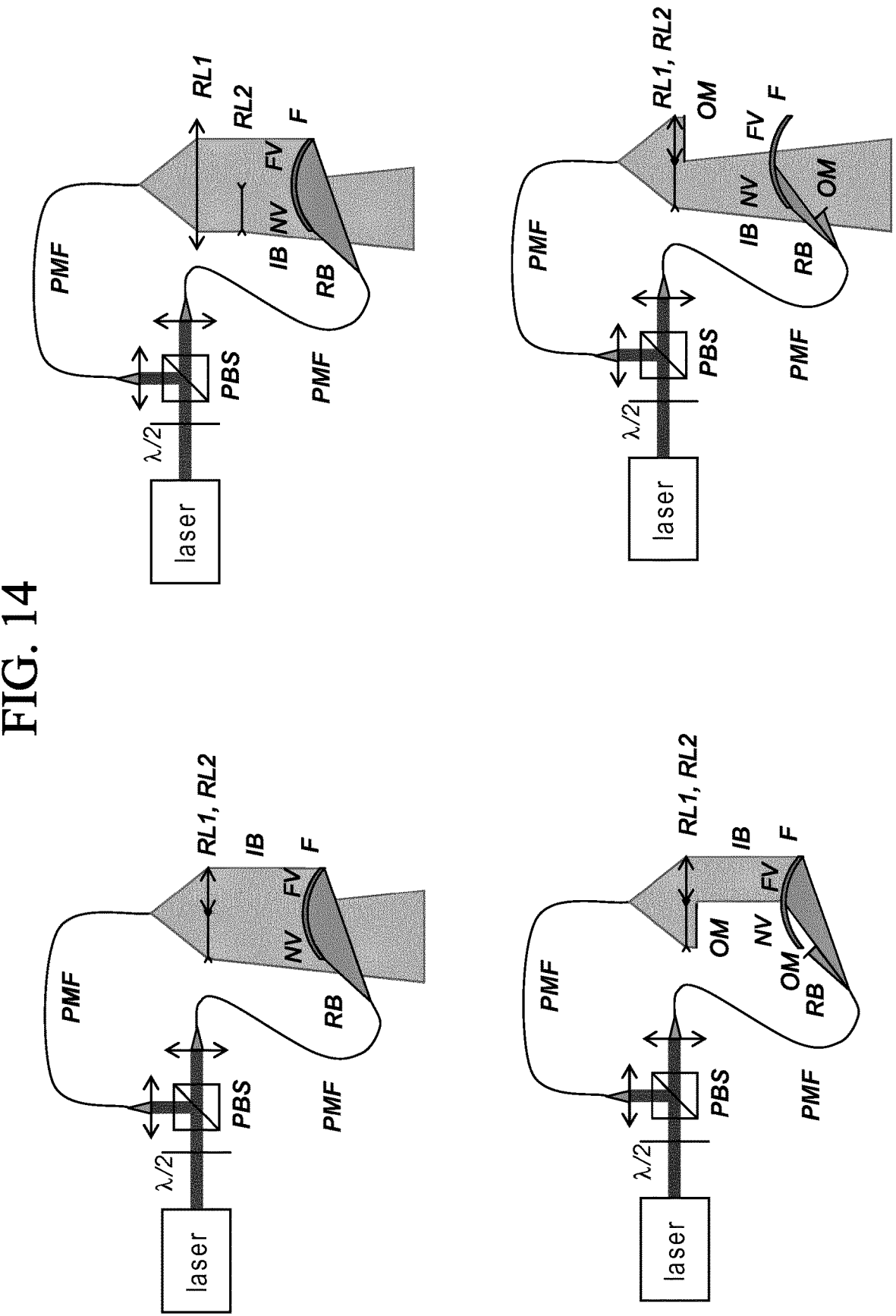
FIG. 14 shows an optical arrangement for recording a holographic mirror in accordance with the invention.

As shown on the right part of FIG. 11, for the first case where the film F is on the front side of the lens L, a light beam from the image source IS passes through the lens L and is reflected on the holographic mirror HM. The reflected wavefront WF is the same than the wavefront of the illumination beam IB, meaning that the virtual image seems to "come" from infinity, i.e. as the natural image. The lens corrects thus the natural vision and the vision of the virtual image at the same time. When the film F is on the rear side on the lens L, the wavefront of the illumination beam after crossing the lens L is divergent on the film F. A beam of the image source IS is thus reflected with the same wavefront than the real image seen through the lens L, and the virtual image seems to be originate from the same place than this real image. To achieve that, the lens may have a value of power identical or close to the prescription data PD of the wearer.

In some embodiments, the optical recording of step (2) further takes into account:
the distance of visualization (D) of said displayed virtual image by the wearer when wearing the frame and/or
the direction of visualization of said displayed virtual image by the wearer when wearing the frame and/or
the number of areas of the holographic mirror for the visualization of said displayed virtual image by the wearer when wearing the frame.

In some embodiments, the wearer is ametropic, the ophthalmic lens of step (1) is configured for correcting the wearer's ametropia for natural vision and is selected from single-vision lenses, multifocal lenses, for example selected from bifocal lenses, and progressive addition lenses.

In some embodiments, the optical arrangement of step (2) is such that the illumination beam (IB) is spatially configured with:
one or more recording lenses (RL, RL1, RL2) selected from unifocal lenses, multifocal lenses such as bifocal lenses, and progressive addition lenses, or a lens matrix (LM), or an active lens with phase modulation and optionally an opaque mask (OM).

In some embodiments, the optical arrangement of step (2) is such that:
the reference beam (RB) simulates the beam of the build-in image source to be used for illuminating said holographic mirror so as to cause the display of the virtual image to be visualized by the wearer when wearing the frame, and
the illumination beam (IB) is configured so as to define the distance of visualization (D) of said displayed virtual image by the wearer when wearing the frame and/or
the direction of visualization of said displayed virtual image by the wearer when wearing the frame and/or
the number of areas of the holographic mirror for the visualization of said displayed virtual image by the wearer when wearing the frame.

In some embodiments, the optical arrangement of step (2) is such that the illumination beam (IB) is configured so as to differentially record a plurality of areas (A1, A2, NV, FV) on the film (F) of unrecorded holographic medium, optionally wherein each area (A1, A2; NV, FV) corresponds to equal or distinct values of distance of visualization (D; D_nv, D_fv) of said displayed virtual image by the wearer and/or corresponds to equal or distinct directions of visualization of said displayed virtual image by the wearer.

In some embodiments, the optical arrangement of step (2) is such that the illumination beam (IB) is configured in accordance with an ergorama, wherein said ergorama defines the distance of visualization (D) and/or direction of visualization of said displayed virtual image by the wearer as a function of the gaze directions when wearing the frame.

In some embodiments, the wearer is ametropic and said method is a method for providing a progressive addition lens (respectively a multifocal lens such as such as a bifocal ophthalmic lens, respectively a single-vision lens), wherein the ophthalmic lens of step (1) is a progressive addition lens (respectively a multifocal lens such as a bifocal ophthalmic lens, respectively a single-vision lens), and wherein the holographic recording of step (2) is performed so that the holographic mirror (HM) comprises at least an area for near vision (NV) and an area for far vision (FV) corresponding to distinct values of distance of visualization (D_nv, D_fv) of displayed virtual image by the wearer.

In some embodiments, the wearer is ametropic and said method is a method for providing a single-vision lens with an HM, wherein the ophthalmic lens of step (1) is a semi-finished lens blank, wherein the optical arrangement of step (2) includes the implementation of an auxiliary single-vision lens (AL) whose optical power takes into account the optical power required to correct the wearer's ametropia and the optical power of the semi-finished lens blank, and wherein the auxiliary single-vision lens (AL) is for spatially configuring the reference beam (RB) or the illumination beam (IB).

In some embodiments, said method is a method for providing a progressive addition lens (respectively a multifocal lens such as a bifocal ophthalmic lens, respectively a single-vision lens) with an HM, wherein the ophthalmic lens of step (1) is a progressive addition lens (respectively a multifocal lens such as a bifocal ophthalmic lens, respectively a single-vision lens), and wherein the holographic recording of step (2) is performed so that the holographic mirror HM comprises at least an area for near vision NV and an area for far vision FV corresponding to distinct values of distance of visualization D_nv, D_fv of displayed virtual image by the wearer. See for example FIG. 14.

Advantageously, the above methods provide holographic mirrors on lenses (e.g. unifocal, multifocal such as bifocal, progressive addition) that provide for dual virtual vision, with the HM mirror specifically configured to comprise at least an area for virtual near vision and at least an area for virtual far vision.

In some embodiments, the method provides a lens with an HM that comprises an amplitude modulation cell as described herein, such as an electrochromic cell EC. See for example illustrative optical arrangements in FIG. 12.

As an alternative to implementing an auxiliary lens (AL), it is possible to directly change the wavefront coming from IB or RB using an active lens with a modulation phase, for example a varying power lens using adaptive optics technics. In some embodiments, the IB is such that it covers an extended field on the lens. See for example FIG. 13.

Configurations of Use

According to the invention, various types of imaging patterns are possible:

In one aspect, the beams from the image source IS are sent to infinite or desired distance (FIG. 4 left). After reflection onto the mirror M, the eye motion box (EMB) can be very wide which simplifies visualization of the virtual image.

In one aspect, the beams from the image source converge on the pupil or the center of rotation of the eye (CRE) after reflection onto the mirror M (FIG. 4 right). In this case, the EMB is small but the brightness of the image is high.

Adjusting the Tunable Mirror to the Wearer

In the case of FIG. 4 right, where the mirror comprises a liquid crystal array, the beams emitted from the image source converge, after reflection onto the mirror, toward the wearer's pupil (or toward the center of rotation of the eye). This configuration allows the wearer to visualize a wide vision field, because the entire field of the image source is displayed simultaneously on the retina.

However, the positioning of the eye (CRE) varies from one wearer to another. The use of a tunable mirror then makes it possible to perform a focus point adjustment.

According to the invention, it is possible to 'fit' the HMD in the three dimensions (customization of the HMD to the wearer): the setting in X and Y directions (horizontal/vertical axis in the plan of the mirror) can be adjusted by changing the programming (control) of the tunable mirror, e.g. so as to add the equivalent of a horizontal or vertical optical prism. For example, in the case of a tunable mirror containing a controllable (programmable) matrix of phase-pixels, a horizontal (resp. vertical) prism may be simulated by creating a phase [Phase (x, y)] which increases/decreases linearly along the horizontal (resp. vertical) axis:

$$\text{Phase}(x,y)=\alpha_x{}^*x.$$

It is then possible to adjust (tune) the amplitude of the prism so as to position the focal point of the beam to the same value X as the pupil or CRO. The change in X/Y of the focusing point may result in a shift in the gaze direction of visualization of the image. A virtual point seen in a direction ($\theta X=0°$, $\theta Y=0°$) may be seen through the mirror, after prism addition, with an angle $\alpha_x$ in a direction ($\theta X=\alpha_x$, $\theta Y=0°$). It is then possible to take into account the correct position (here X) and the shape of the image in the display (trapezoid, etc.) to compensate for this movement, so that the gaze direction remains the same and the geometry remains 'faithful' regardless of the prism value provided by the tunable mirror.

As to the Z axis (corresponding to the visual axis: gaze direction), it is possible to adjust the position of the focal point by adjusting the curvature generated by the tunable mirror: if the curvature is increased, the focal point moves closer to the mirror (and vice versa). The curvature may for example be modified by applying a phase profile, for example: Phase deviation (x, y)=$\beta(x^2+y^2)$. Such phases profiles may then be used to determine the pixel values of the tunable mirror (see above).

In some embodiments, the mirror tuning may be performed in a dynamic fashion: when the wearer moves his eyes to scan the area, the eye pupil and the focusing point are no longer aligned, possibly leading to an at least partial loss of vision of the displayed image. It is possible to then track the position of the eye (pupil) with an eye-tracker and 'enslave' the focal point to this position to ensure the wearer a vision of the virtual image regardless of viewing direction. Such tracking may also be useful to adjust image display further to a position shift of the HMD with respect to the head of the wearer (sliding on the nose, etc.).

The invention is illustrated by the following non-limiting examples.

EXAMPLES

Example 1: Taking into Account of Ophthalmic Data of the Wearer, Such as Prescription Data Where the mirror comprises HPDLC, the prescription may be taken into account using suitable recording steps, as described above.

Where the mirror comprises a liquid crystal matrix, it is possible to compute the image data as a function of the prescription data. The focus distance and/or gaze direction may be computed by taking into account the prescription data, and it may further be computed in real-time. This computation may also take into account changes in wearer prescription data (e.g. after a visit with the eye care specialist), for example by way of parameters to be updated in the HMD processor (controller). In order to adjust the distance of visualization or to take into account the wearer prescription data, the optical beam, after reflection on the tunable mirror, should have a curvature that is modified compared to that of the case of FIG. 2 right (situation of an emmetropic wearer and an image to infinity). By way of example, in the case of a myopic wearer −1D (or to display the image at 1 m), the tunable mirror may be programmed to increase ray curvature, after reflection on the mirror, by a value −1D (compared to an emmetropic situation). By way of example, in the case of an astigmatic wearer, this curvature may be modified differently in different sagittal and/or tangential axes. More generally, the entire function may be managed by the tunable mirror.

Example 2: HMD and Method for Display and Visualization of Multiple Zones

Figure 7:
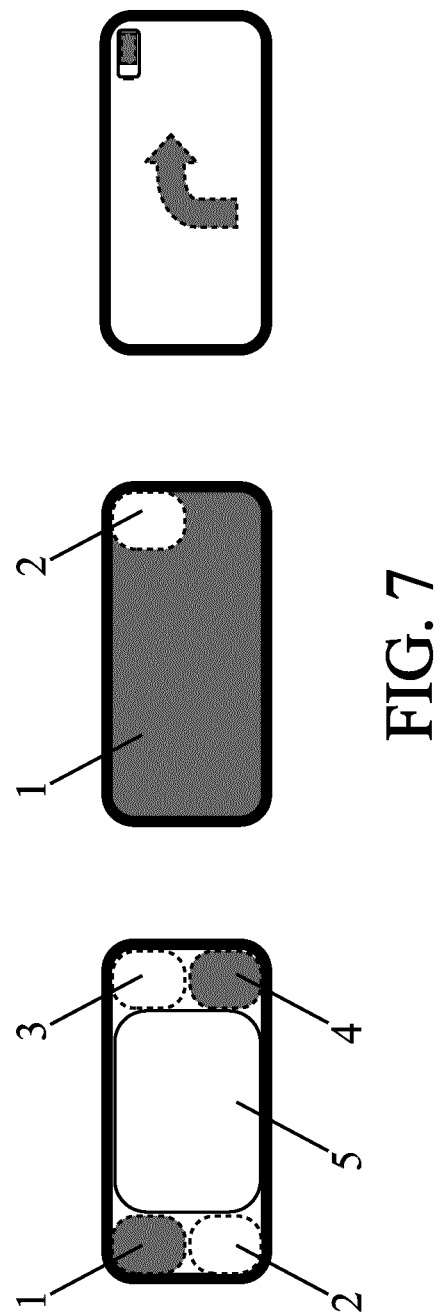
FIG. 7 shows possible visualizations (vision zones) obtained with the HMDs and methods of the invention.

FIG. 7 shows possible images visualized by a wearer. The tunable mirror provides the possibility to use different vision zones. Such zones 1, 2, 3, 4, 5 may be defined according to varying gaze directions. For example (FIG. 7 left), zone 5 corresponds to central vision, while zones 1-4 are peripheral vision. Such zones may also be defined in terms of distance of visualization of the computer-generated image.

Advantageously according to the invention, the tunable mirror makes it possible to differentially tune one or more zones (e.g. sequentially and/or according to prescription data; for example NV vs. FV). This may also be performed in a time lapse fashion, e.g. activate zone 1 only, and then deactivate zone 1 while activating zone 2.

Example 3: HMD and Method for Display and Visualization with Smart Sensors

According to the invention, the HMD may comprise one or more smart sensors. Each sensor may be used to analyze the wearer's environment (real-life environment and wearer), so that the display can be customized for a given situation. The display can advantageously be performed time-lapse to adjust to the situation in 'real-time'.

Example 3.1: HMD and Method for Display and Visualization with Scene Camera as Smart Sensor For applications in augmented reality, it is advantageous to have a scene camera for 'integrating' the virtual objects (computer-generated images) into the real world.

This camera can be a conventional camera. In order for the camera to have a vision field similar to that of the human eye, it is possible to use a wide angle lens, e.g. of the fish-eye type. A conventional camera however generally does not allow the precise determination of the depth of the observed scene field. One method is to use a lens with variable focus and to rebuild (recreate) distances by successively measuring focus distances. It is then possible to visualize an image of the 3D scene and to measure the distance to the objects. A second method is to use multiple cameras. A third method uses the constant movements of the wearer. In this case, knowing the position of the camera (accelerometer, for example), it is possible to trace back the distance and position of objects. Indeed, the image analysis allows the determination of the direction of the beams from the scene, and therefore the position of the objects relative to the camera.

It is also possible to use a plenoptic camera (light-field camera, LFC). There is provided a sensor capable of measuring low-resolution image of the scene on a sufficiently large solid angle (sr $2\pi$). To this end, a micro-lens array is placed in front of a good resolution sensor matrix. Each micro-lens corresponds to a group (subset) of pixels. The beams from the scene are distributed by each micro-lens onto the pixel groups according to their direction and distance of the objects in the scene. It is then possible to obtain an image containing the position, distance and direction of (real) objects. An appropriate image processing can use the collected data for the display of the virtual object and the displayed computer-image can be made to 'evolve' within the real life scene. This can be performed either when this real object is fixed in the wearer's environment (FIG. 5 top: the Eiffel Tower is fixed in the real life scene, but the wearer moves the head: the display of computer-generated image, e.g. an annotation on the Eiffel tower, can 'follow' the gaze direction of wearer, and follow the visualization of the environment, as a function of the head movements of the wearer), or when it is in movement (FIG. 5 bottom: the wearer's head does not move, but the bicycle moves (m) in the real life scene). It is then possible, for example, to determine the position of a real object so as to display a virtual image which is at the same position, and in particular the same distance. This allows the wearer to visualize sharply and simultaneously the real image/virtual image at the same distance of visualization, regardless of its position.

In some aspects, monitoring of the environment may be performed by coupling the scene camera with a shape and/or image recognition software. It becomes then possible to provide a selective display of information (images). If a recognizable object is identified via a database (monument, book, pedestrian, etc.), it then becomes possible to display appropriate corresponding information. This approach decouples the virtual image from the gaze of the wearer. The camera may be equipped with an auto-focus, in which case it is possible to detect the distance to the object and thus determine what will be the distance of focus for the image to be displayed.

Figure 5:
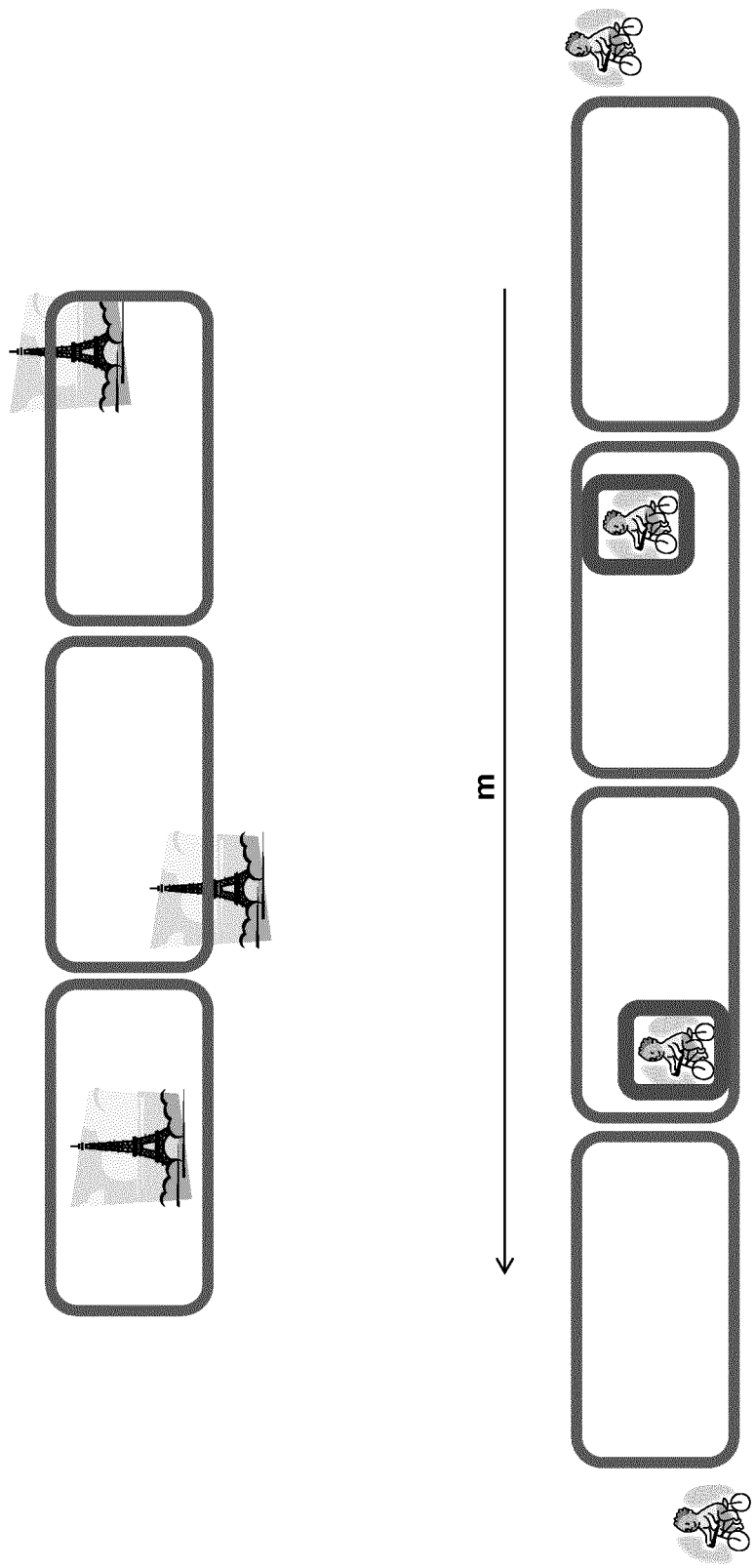
FIG. 5 illustrates time-lapse augmented reality obtainable with the HMDs and methods of the invention.

If the object is fixed, like a book or a building, the displayed image can be 'attached' to this object, and thus may not be permanently displayed before the eyes of the wearer (FIG. 5 top). For example, if the displayed image is the definition of a word in a book, the wearer may not necessarily wish to have this definition remaining in the vision field of view if s/he looks up. There are then several possibilities:

the displayed image may remain where it is (e.g. a given gaze direction in NV), or with the tunable mirror, it is possible to keep superimposing the image onto the object (keep it attached) as long as it is in the mirror field and then turn off the mirror when it comes out. See FIG. 5 top.

If the real object is moving, the displayed image may follow the object in the vision field through the HMD, whether the wearer towards gazes the object or not. By way of example, in a driving situation, if a cyclist is recognized, it may be 'tagged' so that it may be more easily identified and followed by the wearer in the flow of traffic. In this case, the target object is moving, the display (e.g. a cyclist alert) may follow this object (the cyclist) in the vision field (FIG. 5 bottom; cyclist moves according to movement m). With a tunable mirror, the displayed image (alert) is reflected only in the direction and the angle corresponding to the direction of the targeted object. See FIG. 5 bottom.

In both cases as above, the use of a tunable mirror is advantageous, as it does not require a mechanical movement of the image source and it does not require the selective use of only parts of the image source. As a consequence, the entire resolution of the image source can be retained, in all circumstances.

Example 3.2: HMD and Method for Display and Visualization with Luminance or Luminosity Sensor as Smart Sensor The HMD of the invention may include a light (brightness) sensor, such as a luminance or luminosity sensor. For increasing the visual comfort of the wearer, it is advantageous to optimize the brightness and/or contrast of the virtual image and adapt same to the real world in which it is to be embedded.

The HMD of the invention may include a single sensor, a plurality of individual sensors or a sensor array (e.g. CCD, CMOS) for determining the position of bright areas on the mirror. This is particularly advantageous if the sensor array is equipped with a wide angle optical system (lens) similar or identical the angle of human vision.

It is possible to use the scene camera to perform measurements of environmental brightness. Indeed, by calibrating the light sensor, one may obtain a 4D field (position in space and brightness) of the vision field. Such system is advantageously compact. This provides a mapping of the brightness of the scene.

This 4D field may then be used as an extended source for a ray-tracing calculation of the illumination of the pupil (or retina in the situation of an eye model). This calculation may further take into account the wearer's ophthalmic data, including prescription data and/or the position of the eye in relation to the HMD/frame and the vector light source. As a function of the analysis of the scene (presence of zones of high brightness values, "carriers" available for the virtual image, etc.), it is possible to choose to display the image in a dark area for visualization, or to move the displayed image away from a very bright area, or to change the brightness of the screen if necessary, etc.

If the HMD is equipped with electrochromic glass (for example glasses with lenses incorporating an EC cell), the brightness measurement may automatically adapt the EC transmission to ambient conditions; this, either locally if the lens/glass is pixelated, or globally if it is not. In both situations, the 4D illumination matrix obtained via the scene camera may be used to compute the darkening of the lens/glass, e.g. with an algorithm that takes into account the results of psychophysical measurements (e.g. ophthalmic data, including prescription data or eye sensitivity data), such as illumination in central vision, peripheral illumination, etc. This may be performed using a weighting function to be determined. If the lens/glass is pixelated, it may then be possible to darken the area (e.g. zone in the virtual image area, zone in a very bright area, zone in central or peripheral vision, etc.). This coupling of the image display with the environmental analysis performed by the camera can also be used to control the electrochromic glass to only darken the useful spots, for example when it is not necessary or inappropriate or dangerous, to make the HMD/glasses fully dark.

Example 3.3: HMD and Method for Display and Visualization with Eye Tracker as Smart Sensor Eye-Tracking with IR Holographic Mirror To follow the gaze direction and its convergence, and therefore to display the computer-generated images at the distance and in the gaze direction at which the wearer is already looking, it is possible to add an eye-tracking system. Infrared (IR) LEDs can illuminate the wearer's eye (taking into account eye safety). A camera can capture the eye and follow its movements and gaze directions. Classically, this camera may be directed towards the eye.

IR Holographic Mirror

For compactness issues, it is possible to use an IR holographic mirror in the lens to redirect infrared reflection of eye-tracker IR LEDs towards the HMD/glasses temple. This mirror may be active (tunable) or passive. This mirror may be obtained in the same way as the image reflecting mirror, with the difference that it may not be required to take into account the wearer's prescription data. It may thus be achieved very simply. Being reflective in the infrared, it does not hamper the vision and the display in the visible spectrum, and will be totally transparent to the wearer.

Gaze Convergence

Figure 6:
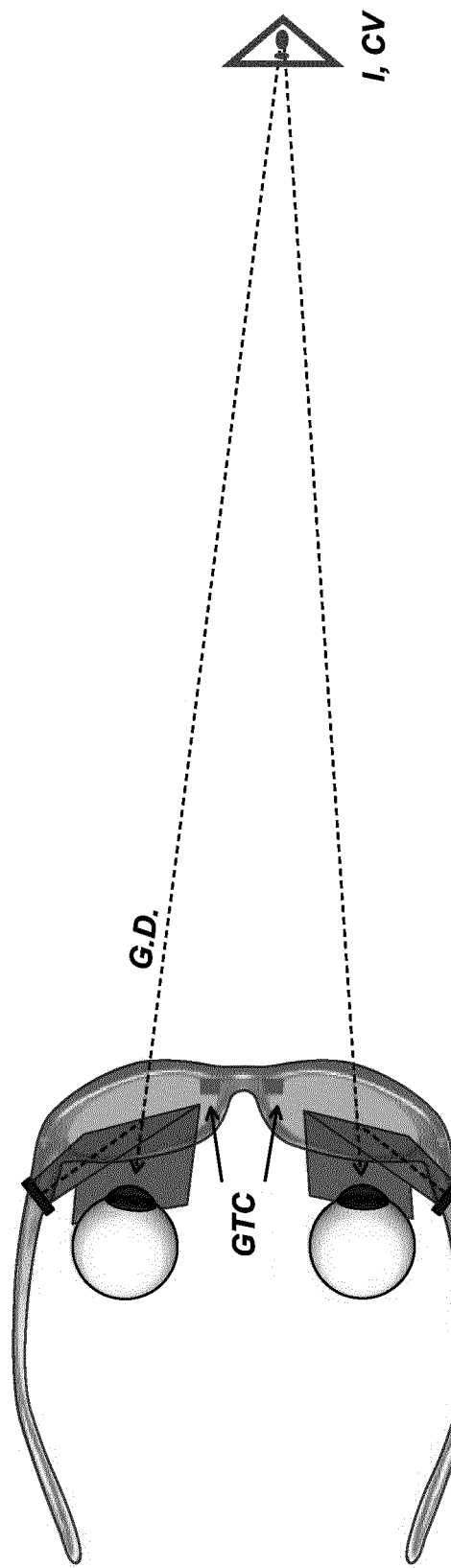
FIG. 6 shows principle for using convergence and gaze direction in order to determine focus distance for the display of the computer-generated image and the direction for reflection of this image.

A gaze convergence measurement can provide the focus distance (FIG. 6). It becomes then possible to adapt the virtual image so that it appears to come from the same point as the one that the wearer already views in real life. This advantageously makes it possible to reduce or totally avoid accommodation efforts between visualizing computer-generated (virtual) images and visualizing real objects. The vision will be more comfortable and occasion less ocular fatigue.

The gaze direction may provide the angle at which the mirror can be tuned to reflect the image (FIG. 6). This enables to display the image correctly centered on the eye. The tunable mirror will thus allow the displayed image to follow the gaze of the wearer with every moment, for an optimized location of the displayed image. Such technical effect cannot be obtained with a non-tunable (set) mirror. FIG. 6: GTC: gaze-tracking cameras; GD: gaze direction; I: displayed image; CV: convergence zone.

Coupling and Uncoupling Gaze-Tracking and Scene Measurements (Environment Monitoring)

In some embodiments, the eye-tracking function may be decoupled from environment monitoring (scene camera). This could be advantageous in some situations. In some embodiments, it is possible to pair (couple) the two functions: eye-tracking and environment monitoring. This allows an informed eye tracking. For example it is possible to follow the gaze in far vision FV, while there is no interest for near vision NV depending upon the nature of the displayed information (images). There may be however some interest for NV, in view of the nature of the displayed images. In this case, the displayed images may be retained for NV, either in a set location, or in a controlled gazing location that is attached to an object in real life. The displayed image may again follow the gaze when reverting to FV.

Example 4: Holographic Mirror HM for an HMD and Method for Display and Visualization An example of recording of a holographic mirror is shown at FIG. 8, which depicts an exemplary optical arrangement for recording a holographic mirror on a lens (lens not shown). In this example the laser emits at 532 nm (100 mW). PMF is a polarization-maintaining fiber (460-HP Nufern): panda fiber, core diameter 2.5 μm, ON 0.13, mode diameter: 3.5 μm @ 515 nm. The collimating lenses next to the polarization beam splitter PBS are of f=8 mm. the illumination beam IB is of 1 mW/cm$^2$. The reference beam RB is of 0.5 mW/cm$^2$. The lens generating the RB is of f=4 mm. The lens generating the IB (reference lens, RL) is of f=400 mm.

The lens on which the HM is formed is not shown. This lens is as follows: power −3δ, front surface radius 87 mm, shape eyeglasses lens 40×50 mm or round diameter 70 mm. the film F is formed between two glass layers and positioned on the front side of the lens. The film F is as follows: diameter 70 mm, radius of curvature 87 mm, glass layer thickness 850 μm, photopolymer F thickness 5 to 50 μm (e.g. 40 μm) thanks to spacers, total stacking thickness ~1.65 mm, exposure time: 30 s to 10 min depending upon nature of photopolymer.

Depositing the film F for a lens of 70 mm diameter:
depositing a 50 μL drop onto a glass layer (spacers: 5-50 μm, glass layer: thickness 500 μm; radius of curvature 87 mm, round diameter 70 mm; anti-reflection treatment or coating, especially 532 nm),
positioning second glass layer; tightening,
leave at rest for 20 min onto the illumination support member.
Illumination for 30 s to 6 min, as a function of the beam intensity, nature and thickness of photopolymer
Bleaching by exposition to visible light for 15 min (e.g. halogen lamp, 50 to 75 W).
Sealing with glue if necessary.
During illumination:
protect from physical disturbance (air movements, mechanical vibrations, dust, etc.)
stabilized temperature (avoid air convection)
black room (dark room: for example inactinic lighting for recording green light)
coating (anti-reflection) onto glass (avoiding parasite reflections).
Characterization:
Spectral (wavelength for reflection and mirror efficiency)
Qualitative optical properties (observe an OLED screen)
Quantitative optical properties (wave front analysis).
It is possible to combine with an EC cell.

The invention claimed is:

1. A head-mounted device to be worn by a wearer, configured for display and visualization, by the wearer, of computer-generated images, the head-mounted device comprising:
   an image source;
   a see-through tunable diffractive mirror, situated in front of one eye of the wearer;
   a controller configured to tune the mirror;
   an ophthalmic lens; and
   at least one scene camera,
   wherein the image source is configured for emission of a light beam towards the mirror, wherein the emitted light beam is reflected onto the mirror and thereby is directed towards the eye of the wearer, to cause visualization of a computer-generated image by the wearer,
   wherein the head-mounted device is configured to:
      determine a distance and/or gaze direction of visualization by the wearer, of an object in a natural vision field, based on data collected from the scene camera; and
      tune the mirror to adjust the distance and/or gaze direction of visualization by the wearer, of the computer-generated image, as a function of the distance and/or gaze direction determined by the head-mounted device,
   wherein the at least one scene camera is a plenoptic camera provided with a micro-lens array placed in front of a sensor matrix configured to analyze a scene in natural vision, in which each micro-lens corresponds to a group of pixels so that beams from the scene are distributed by each micro-lens onto the pixel groups according to their direction and distance of the object in the scene, in order to obtain an image containing the position, distance, and direction of the object in natural vision,
   the head-mounted device being configured to integrate into the scene the adjusted computer-generated image, which evolves within the scene,
   wherein the ophthalmic lens is configured to correct a wearer's ametropia in natural vision, the ophthalmic lens being a multifocal lens selected from bifocal lenses and progressive addition lenses,
   wherein the mirror is provided on the ophthalmic lens, being provided on a front face, on a rear face, or within the bulk of the ophthalmic lens,
   wherein the mirror comprises at least an area for near vision and an area for far vision corresponding to distinct values of distance of visualization of the displayed computer-generated image by the wearer, and
   wherein the mirror is tuned to adjust the wearer's vision for the visualization of the displayed computer-generated image, the mirror being tuned to correct the wearer's ametropia for the visualization of the computer-generated image by the wearer.

2. The head-mounted device according to claim 1, wherein the mirror comprises several areas of tunable refractive index/indices.

3. The head-mounted device according to claim 1, wherein the mirror comprises an array of individually tunable pixels.

4. The head-mounted device according to claim 1, wherein the mirror comprises an array of individually tunable recorded holographic pixels.

5. The head-mounted device according to claim 4, wherein the array is an array of polymer dispersed liquid crystals or of holographic polymer dispersed liquid crystals.

6. The head-mounted device according to claim 1,
   wherein the mirror comprises a tunable transparent array of liquid crystal, and
   wherein the array is active or passive.

7. The head-mounted device according to claim 6, wherein the array is a transmission phase-only spatial light modulator.

8. The head-mounted device according to claim 1, further comprising at least one sensor selected from:
   one or more luminance sensors and luminosity sensors, or
   one or more eye-trackers.

9. The head-mounted device according to claim 1, wherein the mirror is further tuned for:
   adjusting apparent size of visualization of the computer-generated image by the wearer, or
   adjusting focal point for visualization of the computer-generated image to the position of the eye of the wearer, or
   correcting secondary optical aberrations in the visualization of the computer-generated image by the wearer which are selected from aspherization and field aberrations, or
   partially or fully switching OFF or ON the visualization of the computer-generated image by the wearer.

10. A method for integrating into a scene in natural vision a computer-generated image by a see-through head-mounted device to be worn by a wearer, with a see-through tunable diffractive mirror of the head-mounted device, wherein the head-mounted device comprises an image source and at least one scene camera which is a plenoptic camera provided with a micro-lens array placed in front of a sensor matrix configured to analyze the scene in natural vision, in which each micro-lens corresponds to a group of pixels, and wherein the image source is configured for emission of a light beam towards the mirror, wherein the emitted light beam is reflected onto the mirror and thereby is directed towards an eye of the wearer, to cause visualization of a computer-generated image by the wearer, the method comprising:
   adjusting a distance and/or gaze direction of visualization, by the wearer, of the computer-generated image, as a function of a determined distance and/or gaze direction of visualization, by the wearer, of an object in a natural vision field, based on data collected from the scene camera so that beams from the scene are distributed by each micro-lens onto the pixel groups according to their direction and distance of the object in the scene, in order to obtain an image containing the position, distance, and direction of the object in natural vision and so that the adjusted computer-generated image evolves within the scene,
   wherein an ophthalmic lens of the head-mounted device corrects a wearer's ametropia in natural vision and is a multifocal lens selected from bifocal lenses and progressive addition lenses,
   wherein the mirror, which is provided on the ophthalmic lens on a front face, on a rear face, or within the bulk of the ophthalmic lens, comprises at least an area for near vision and an area for far vision corresponding to distinct values of distance of visualization of the displayed computer-generated image by the wearer, and
   wherein the mirror is tuned to adjust the wearer's vision for the visualization of the displayed computer-generated image, the mirror being tuned to correct the wearer's ametropia for the visualization of the computer-generated image by the wearer.

11. The method according to claim 10, further comprising:
adjusting apparent size of visualization of the computer-generated image by the wearer; or
adjusting focal point for visualization of the computer-generated image to a position of the eye of the wearer; or
correcting secondary optical aberrations in the visualization of the computer-generated image by the wearer; or
partially or fully switching OFF or ON the visualization of the computer-generated image by the wearer.

12. A method for the display and visualization of computer-generated images, the method comprising:
tuning a see-through tunable diffractive mirror of a head-mounted device, the head-mounted device including an image source, the mirror, which is situated in front of one eye of a wearer, a controller configured to tune the mirror, and at least one scene camera which is a plenoptic camera provided with a micro-lens array placed in front of a sensor matrix configured to analyze a scene in natural vision, in which each micro-lens corresponds to a group of pixels, wherein the image source is configured for emission of a light beam towards the mirror, wherein the emitted light beam is reflected onto the mirror and thereby is directed towards the eye of the wearer, to cause visualization of a computer-generated image by the wearer, wherein the tuning comprises
determining a distance and/or gaze direction of visualization, by the wearer, of an object in the natural vision field, based on data collected from the scene camera so that beams from the scene are distributed by each micro-lens onto the pixel groups according to their direction and distance of the object in the scene, in order to obtain an image containing the position, distance, and direction of the object in natural vision, and
tuning the mirror to adjust the distance and/or gaze direction of visualization, by the wearer, of the computer-generated image, as a function of the distance and/or gaze direction determined by the determining,
wherein an ophthalmic lens of the head-mounted device corrects a wearer's ametropia in natural vision and is a multifocal lens selected from bifocal lenses and progressive addition lenses,
wherein the mirror, which is provided on the ophthalmic lens on a front face, on a rear face, or within the bulk of the ophthalmic lens, comprises at least an area for near vision and an area for far vision corresponding to distinct values of distance of visualization of the displayed computer-generated image by the wearer, and
wherein the mirror is tuned to correct the wearer's ametropia for the visualization of the computer-generated image by the wearer.

13. The method according to claim 12, wherein the determining further comprises performing image recognition, and the tuning further comprises repeating the determining and tuning in a time-lapse fashion.

14. The method according to claim 12,
wherein the head-mounted device further comprises at least one luminance or luminosity sensor, and
wherein the tuning further comprises:
determining at least one value of luminance or of luminosity, based on data collected from the luminance or luminosity sensor, and
tuning the mirror to adjust the gaze direction of visualization, by the wearer, of the computer-generated image, as a function of values determined by the determining of the at least one value.

15. The method according to claim 14, wherein the head-mounted device further comprises an electrochromic cell located in front of the eye of the wearer, wherein the tuning further comprises controlling the electrochromic cell as a function of the value(s) determined, and repeating the determining of the at least one value and the tuning in a time-lapse fashion.

16. The method according to claim 12,
wherein the head-mounted device further comprises at least one eye-tracker, and
wherein the tuning further comprises:
determining a distance or gaze direction of visualization, by the wearer, of an object in the natural vision field, based on data collected by the eye tracker, and
tuning the mirror to adjust the distance or gaze direction of visualization, by the wearer, of the computer-generated image, as a function of values determined by the determining of the distance or the gaze direction.

17. The method according to claim 16, wherein the tuning further comprises repeating the determining of the distance or the gaze direction and the tuning in a time-lapse fashion.

18. The method according to claim 12,
wherein the image source is configured to adjust at least partially the wearer's vision for the visualization of the displayed computer-generated image, and
where the wearer is ametropic, the image source is configured to correct at least partially the wearer's ametropia for the visualization of the displayed computer-generated image.

19. The method according to claim 12, wherein the tuning further comprises tuning the mirror to:
adjust apparent size of visualization of the computer-generated image by the wearer, or
adjust focal point for visualization of the computer-generated image to a position of the eye of the wearer, or
correct secondary optical aberrations in the visualization of the computer-generated image by the wearer, or
partially or fully switch OFF or ON the visualization of the computer-generated image by the wearer.

* * * * *